(12) United States Patent
Ohno et al.

(10) Patent No.: US 9,394,934 B2
(45) Date of Patent: Jul. 19, 2016

(54) FASTENING METHOD AND CYLINDER DEVICE

(71) Applicant: HITACHI AUTOMOTIVE SYSTEMS, LTD., Hitachinaka-shi, Ibaraki (JP)

(72) Inventors: Takayuki Ohno, Yokohama (JP); Makoto Nishimura, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 764 days.

(21) Appl. No.: 13/625,568

(22) Filed: Sep. 24, 2012

(65) Prior Publication Data

US 2013/0104732 A1 May 2, 2013

(30) Foreign Application Priority Data

Oct. 31, 2011 (JP) .................................. 2011-238712
Jul. 27, 2012 (JP) .................................. 2012-167385

(51) Int. Cl.
| | |
|---|---|
| *F16B 39/28* | (2006.01) |
| *F16B 39/02* | (2006.01) |
| *F16F 9/32* | (2006.01) |
| *B21K 25/00* | (2006.01) |
| *B21D 39/04* | (2006.01) |
| *B21J 7/14* | (2006.01) |
| *B23P 11/00* | (2006.01) |

(52) U.S. Cl.
CPC ............ *F16B 39/026* (2013.01); *B21D 39/048* (2013.01); *B21J 7/14* (2013.01); *B21K 25/00* (2013.01); *F16F 9/3228* (2013.01); *B23P 11/005* (2013.01); *Y10T 29/49954* (2015.01)

(58) Field of Classification Search
CPC ..... F16B 39/026; F15B 15/204; F15B 15/149
See application file for complete search history.

(56) References Cited

U.S. PATENT DOCUMENTS

| | | | | |
|---|---|---|---|---|
| 3,464,472 | A | * | 9/1969 | Reynolds .............. F16B 19/008 411/336 |
| 4,858,299 | A | * | 8/1989 | Wing .................... B25B 13/065 29/446 |
| 4,995,777 | A | * | 2/1991 | Warmington ................. 411/361 |
| 5,725,076 | A | * | 3/1998 | Pierce et al. .................. 188/170 |

(Continued)

FOREIGN PATENT DOCUMENTS

| | | |
|---|---|---|
| JP | A-01-299310 | 12/1989 |
| JP | A-07-019230 | 1/1995 |
| JP | A-10-205514 | 8/1998 |

(Continued)

OTHER PUBLICATIONS

Mar. 1, 2016 Office Action issued in Japanese Application No. 2012-167385 (with translation).

*Primary Examiner* — Nathaniel Wiehe
*Assistant Examiner* — Daniel Collins
(74) *Attorney, Agent, or Firm* — Nixon & Vanderhye P.C.

(57) ABSTRACT

A fastening method for fastening a nut to a bolt by screwing includes preparing a nut including a tool mounting portion formed on a seat surface, and an annular thin portion formed on the tool mounting portion opposite to the seat surface, swaging a plurality of places of the thin portion with punches from an outer circumferential direction, and flowing a thickness of the thin portion so as to extend to a front end of the bolt partially in a circumferential direction to be closely adhered to a screw portion of the bolt.

13 Claims, 16 Drawing Sheets

(56) References Cited

U.S. PATENT DOCUMENTS 6,325,582 B1 * 12/2001 Sadri et al. ............... 411/361
8,312,606 B2 * 11/2012 Reid et al. ............... 29/263

FOREIGN PATENT DOCUMENTS

| JP | A-2005-226685 | 8/2005 |
| JP | 2007-046666 | 2/2007 |

* cited by examiner

FASTENING METHOD AND CYLINDER DEVICE

BACKGROUND OF THE INVENTION

1. Field of the Invention

The present invention relates to a fastening method and a cylinder device.

Priority is claimed on Japanese Patent Applications No. 2011-238712 filed on Oct. 31, 2011, and No. 2012-167385 filed on Jul. 27, 2012, the contents of which are incorporated herein by reference.

2. Description of Related Art

There is an art related to loosening prevention of a nut (for example, see Japanese Unexamined Patent Application, First Publication No. 2007-46666).

It is required to increase a torque need to loosen a nut.

SUMMARY OF THE INVENTION

The present invention provides a fastening method and a cylinder device that enable the torque need to loosen a nut to be increased.

According to a first aspect of the present invention, a fastening method fastening a nut to a bolt by screwing includes: preparing a nut including a tool mounting portion formed on a side of a seat surface and an annular thin portion formed on the tool mounting portion opposite to the seat surface of the nut, swaging a plurality of places of the thin portion with punches from an outer circumferential direction, and flowing a thickness of the thin portion so as to extend to a front end of the bolt partially in a circumferential direction to be closely adhered to a screw portion of the bolt.

A screw portion of the bolt may be deformed partially in the circumferential direction by an extended portion of the nut extending to the front end of the bolt.

A length of the extended portion of the nut extending to the front end of the bolt may be longer than a length obtained by dividing a pitch dimension of the screw portion of the bolt by a number of swaged portions.

A length of the extended portion of the nut extending to the front end of the bolt may be longer than the pitch dimension of the screw portion of the bolt.

A deformed portion with a deformed screw thread may be formed on the exposed portion not covered with the thin portion of the screw portion.

The deformed portion may be formed by applying a force to the screw portion in the radial direction.

The deformed portion may be formed at a position in a circumferential direction of the screw portion corresponding to a portion on which the swaging process of the thin portion is not performed.

In the swaging process, a plurality of punches may be disposed uniformly in the circumferential direction and these punches are pressed simultaneously to the thin portion.

A length of the punch may be equal to or greater than a length of the swaged portion after the swaging process of the thin portion with respect to the axial direction.

The punch may have a concave contact surface which contacts with the thin portion.

According to a second aspect of the present invention, a cylinder device includes: a piston which is installed slidably in a cylinder with a fluid sealed therein, a channel which is formed in the piston to flow the fluid therein, a rod of which one end is inserted into the piston and an annular disk valve for opening and closing the channel and the other end thereof extends outward from the cylinder, and a nut which is screwed to a screw portion formed on one end of the rod to apply an axial force to the piston and the disk valve. A tool mounting portion is formed on a side of a seat surface of the nut, and an annular thin portion is formed on the tool mounting portion opposite to the seat surface. A plurality of swaged portions is formed circumferentially on the thin portion. An extended portion, in which the thickness of the thin portion flows and extends to a front end of the rod partially in the circumferential direction, is formed in the swaged portion, and the extended portion closely adheres to the screw portion of the rod.

The screw portion of the rod facing the extended portion may have a corrugated deformed portion.

A length of the extended portion extending to the front end of the rod of the nut may be longer than a length obtained by dividing the pitch dimension of the screw portion of the rod by the number of swaged portions.

A length of the extended portion extending to the front end of the rod of the nut may be longer than the pitch dimension of the screw portion of the rod.

According to the above-mentioned fastening method and cylinder device, it is possible to increase the torque need to loosen the nut.

DETAILED DESCRIPTION OF THE INVENTION

A fastening method and a shock absorber, which is a cylinder device, employing the same according to a first embodiment of the present invention will be described with reference to FIGS. 1 to 10.

Figure 1:
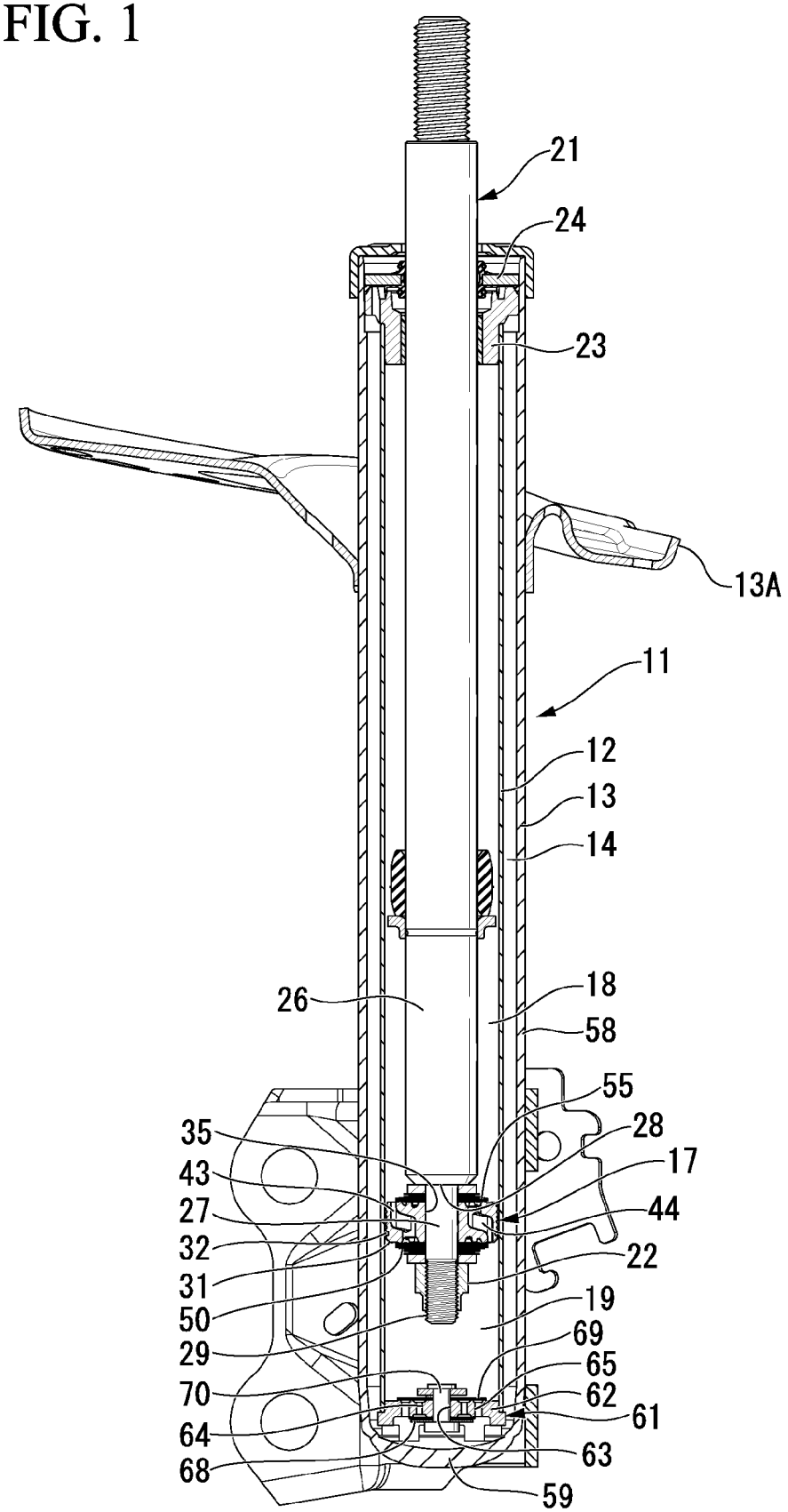
FIG. 1 is a cross-sectional view showing a shock absorber, which is a cylinder device according to a first embodiment of the present invention.

As shown in FIG. 1, the shock absorber related to the present embodiment is used as a suspension strut for an automobile. This shock absorber has a cylinder 11 sealed with a fluid such as a liquid or gas. This cylinder 11 has a cylindrical inner tube 12 and a bottomed cylindrical outer tube 13 installed concentrically so as to cover the inner tube 12 with a diameter larger than that of the inner tube 12. The cylinder 11 has a dual tube structure in which a reservoir chamber 14 is formed between the inner tube 12 and the outer tube 13. A spring sheet 13A which supports the bottom end of a spring (not shown) for suspending a vehicle is installed in the outer tube 13.

A piston 17 is slidably inserted in the inner tube 12 of the cylinder 11. This piston 17 is fitted into the inner tube 12 of the cylinder 11 to divide the inside of the inner tube 12 into two chambers such as an upper chamber 18 and a lower chamber 19. Although not shown, an operating fluid is sealed as a fluid in the upper chamber 18 and lower chamber 19 of the cylinder 11. Further, an operating fluid and gas are sealed as a fluid in the reservoir chamber 14 of the cylinder 11. Meanwhile, a cylinder device to which the present embodiment is applied may be a cylinder of a single tube type, and is not restricted in type but may be used as a hydraulic or pneumatic cylinder rather than the shock absorber.

A rod (a bolt) 21 is inserted into the inner tube 12 of the cylinder 11. One end of the rod 21 is disposed in the inner tube 12 and the other end thereof extends outward from the cylinder 11. The other end of the rod 21 extending outward from the cylinder 11 is mounted on the vehicle. The piston 17 is fastened by a nut 22 to one end of the rod 21 disposed in the inner tube 12. The other end of the rod 21 is inserted into a rod guide 23 and an oil seal 24 which are mounted on one end portion of the inner tube 12 and the outer tube 13 and extends outward. The rod guide 23 has a stepped shape. A small diameter portion of the rod guide 23 is fitted into the inner tube 12. A large diameter portion of the rod guide 23 is fitted into the outer tube 13.

The rod 21 has a main shaft portion 26 and a mounting shaft portion 27 having a diameter smaller than that of the main shaft portion 26. The mounting shaft portion 27 is disposed at an inner end portion of the rod 21 in the cylinder. A stepped surface 28 along the direction orthogonal to an axial direction is formed at the end portion of the mounting shaft portion 27 of the main shaft portion 26. A male screw portion 29 configured to be screwed with the nut 22 is formed within a predetermined range on the mounting shaft portion 27 opposite to the main shaft portion 26.

The piston 17 has a piston body 31 connected to the rod 21 and a sliding contact member 32 mounted on the outer circumference of the piston body 31. The piston body 31 has a substantially disk shape. The sliding contact member 32 slidably contacts with the inner tube 12. A rod insertion hole 35 is formed in the center of the radial direction of the piston body 31 so as to penetrate the piston body 31 in the axial direction. The mounting shaft portion 27 of the rod 21 is inserted into the rod insertion hole 35 of the piston body 31.

Figure 2:
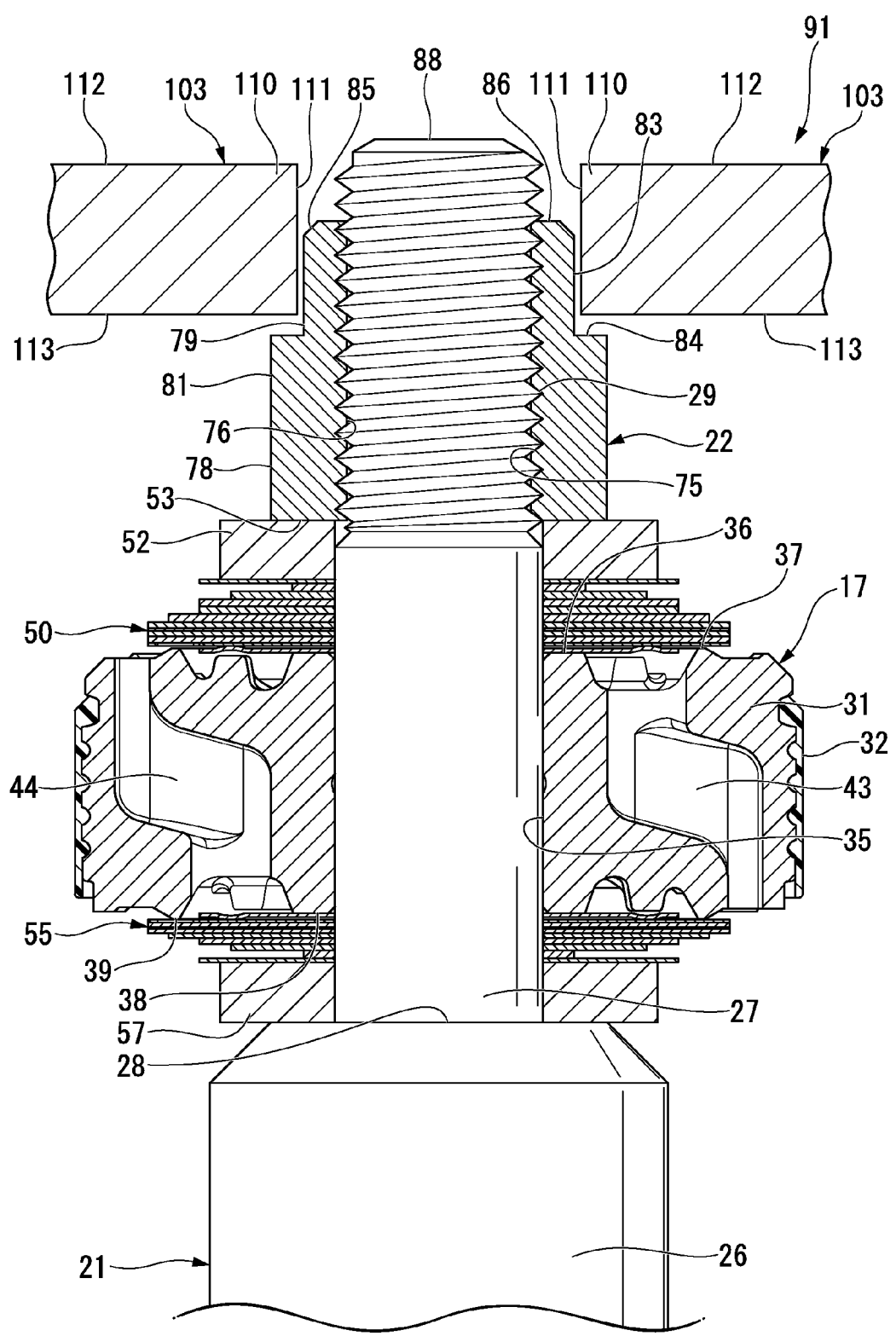
FIG. 2 is a partially enlarged cross-sectional view showing a major portion of the shock absorber, which is the cylinder device according to the first embodiment of the present invention, and a swaging device.

As shown in FIG. 2, an annular mounting boss portion 36 and an annular seat portion 37 are formed in the piston body 31. The mounting boss portion 36 protrudes in an axial direction at an outside in the radial direction of the rod insertion hole 35 at the axially opposite side of the main shaft portion 26 of the piston body 31. The seat portion 37 protrudes in an axial direction at the outside in the radial direction of the mounting boss portion 36 of the piston body 31. An annular mounting boss portion 38 and an annular seat portion 39 are formed in the piston body 31 on a side of the main shaft portion 26 in the axial direction. The mounting boss portion 38 protrudes in a radial direction at the outside of the rod insertion hole 35 of the piston body 31. The seat portion 39 protrudes in an axial direction at the outside in the radial direction of the mounting boss portion 38 of the piston body 31.

A plurality of channels 43 that penetrate in the axial direction (only one channel is shown in FIG. 2 as it is shown in a cross section) are formed in the piston body 31 at intervals in a circumferential direction. One axial end of the channel 43 is opened between the mounting boss portion 36 and the seat portion 37, and the other axial end thereof is opened outward in the radial direction from the seat portion 39. Further, a plurality of channels 44 that penetrate in the axial direction (only one channel is visible in FIG. 2 as it is shown in a cross section) are formed in the piston body 31 at intervals in a circumferential direction. One axial end of the channel 44 is opened outward in the radial direction from the seat portion 37, and the other axial end thereof is opened between the mounting boss portion 38 and the seat portion 39.

A disk valve 50 and a valve regulating member 52 are installed on the axially opposite side of the main shaft portion 26 of the piston body 31 sequentially from the piston body 31. The disk valve 50 and the valve regulating member 52 have annular shapes. The mounting shaft portion 27 of the rod 21 is inserted into each inner periphery of the disk valve 50 and the valve regulating member 52. In this state, the inner peripheries thereof are clamped by the seat surface 53 of the nut 22 and the mounting boss portion 36 of the piston body 31.

A disk valve 55 and a valve regulating member 57 are installed on a side of the main shaft portion 26 of the piston body 31 in the axial direction sequentially from the piston body 31. The disk valve 55 and the valve regulating member 57 have annular shapes. The mounting shaft portion 27 of the rod 21 is inserted into each inner periphery of the disk valve 55 and the valve regulating member 57. In this state, the inner periphery thereof is clamped by the mounting boss portion 38 of the piston body 31 and the stepped surface 28 of the main shaft portion 26 of the rod 21.

The disk valve 50 installed on the axially opposite side of the main shaft portion 26 of the piston 17 is configured by laminating a plurality of single disks. The disk valve 50 closes the channel 43 by abutting the seat portion 37 of the piston body 31. In addition, the disk valve 50 opens the channel 43 as the outer periphery thereof is bent to be separated from the piston body 31 when the rod 21 moves to the extension side that increases the protrusion amount out of the cylinder 11 shown in FIG. 1. Accordingly, when the rod 21 has moved to the extension side, the operating fluid flows from the upper chamber 18 to the lower chamber 19 through the channel 43 formed in the piston 17 due to the increased pressure in the upper chamber 18. The disk valve 50 configures an attenuation valve on the extension side that generates damping force by adjusting the opening/closing amount of the channel 43. The valve regulating member 52 shown in FIG. 2 regulates the deformation above a predetermined amount in the separation direction from the seat portion 37 of the disk valve 50.

The disk valve 55 installed on a side of the main shaft portion 26 of the piston 17 is also configured by laminating a plurality of single disks. The disk valve 55 closes the channel 44 by abutting the seat portion 39 of the piston body 31. In addition, the disk valve 55 opens the channel 44 as the outer periphery thereof is bent to be separated from the piston body 31 when the rod 21 has moved to the compression side that increases an insertion amount into the cylinder 11 shown in FIG. 1. Accordingly, when the rod 21 has moved to the compression side, the operating fluid flows from the lower chamber 19 to the upper chamber 18 through the channel 44 formed in the piston 17 due to the increased pressure in the lower chamber 19. The disk valve 55 configures an attenuation valve of the compression side that generates damping force by adjusting the opening/closing amount of the channel 44. The valve regulating member 57 shown in FIG. 2 regulates deformation above a predetermined amount in the separation direction from the seat portion 39 of the disk valve 55.

Meanwhile, these disk valves or the like may not be included. Further, a lift valve that lifts without clamping the inner periphery or a poppet valve that is installed in the piston 17 may be used as well.

As shown in FIG. 1, the outer tube 13 has a cylindrical housing portion 58 and a lower surface portion 59 for closing one end of the housing portion 58. A base valve 61 that defines the lower chamber 19 and the reservoir chamber 14 11 is installed in the cylinder chamber between the lower surface portion 59 of the outer tube 13 and the inner tube 12. The base valve 61 has a valve body 62 having substantially a disk shape which is fitted into the cylinder 11 to divide the inside of the cylinder 11 into two chambers such as the lower chamber 19 and the reservoir chamber 14. The valve body 62 has a stepped shape. The valve body 62 has a small diameter portion fitted into the inner tube 12.

A pin insertion hole 63 is formed in the center of the radial direction of the valve body 62 so as to penetrate in the axial direction. Further, a plurality of channels 64 that penetrate in the axial direction are formed outside in the radial direction from the pin insertion hole 63 of the valve body 62 at intervals in a circumferential direction. A plurality of channels 65 that penetrate in the axial direction are formed outside in the radial direction from the channels 64 of the valve body 62 at intervals in a circumferential direction. The channels 64 inside in the radial direction enable the operating fluid to flow between the lower chamber 19 and the reservoir chamber 14, and the channels 65 outside in the radial direction enable the operating fluid to flow between the lower chamber 19 and the reservoir chamber 14.

The base valve 61 has a disk valve 68 that acts as an attenuation valve on a side of the axial reservoir chamber 14 of the valve body 62. Further, the base valve 61 has a disk valve 69 that acts as a suction valve on a side of the axial lower chamber 19 of the valve body 62. Each of the disk valves 68 and 69 has an annular shape. The inner periphery of the disk valve 68 and the disk valve 69 is clamped by the valve body 62 and a mounting pin 70 that is inserted into each of the valves and inserted into the pin insertion hole 63 of the valve body 62.

The disk valve 68 opens and closes the channel 64 inside in the radial direction. When the pressure in the lower chamber 19 increases as the rod 21 moves toward the compression side and the piston 17 moves toward the lower chamber 19, the disk valve 68 is separated from the valve body 62 to open the inner channel 64. Accordingly, when the rod 21 has moved to the compression side, the fluid flows from the lower chamber 19 to the reservoir chamber 14 through the channel 64 formed in the valve body 62 inside in the radial direction. The disk valve 68 configures a disk valve on the compression side that generates damping force due to opening and closing the channel 64. Meanwhile, the disk valve 68 performs the function of flowing the liquid from the lower chamber 19 to the reservoir chamber 14 so as to discharge the surplus of the liquid generated mainly by the entry of the rod 21 into the cylinder 11, from the relationship with the compression side disk valve 55 installed in the piston 17. Meanwhile, the compression side disk valve may be a relief valve that relieves the pressure when the internal pressure of the cylinder increases.

The disk valve 69 on the lower chamber 19 opens and closes the outer channel 65. When the pressure in the lower chamber 19 decreases as the rod 21 moves toward the extension side and the piston 17 moves toward the upper chamber 18, the disk valve 69 is separated from the valve body 62 to open the channel 65. Accordingly, when the rod 21 has moved toward the extension side, the fluid flows from the reservoir chamber 14 to the lower chamber 19 through the channel 65 formed in the valve body 62 outside in the radial direction. The disk valve 69 configures a disk valve on the extension side for opening and closing the channel 65. The disk valve 69 performs the function of flowing the liquid from the reservoir chamber 14 to the lower chamber 19 without substantial resistance (to the extent that the damping force is not generated) for supplementing shortage of the liquid due to mainly the protrusion from the cylinder 11 of the rod 21, from the relationship with the extension side disk valve 50 installed in the piston 17.

Meanwhile, a simple orifice may be used without the valve body 62.

As shown in FIG. 2, the mounting shaft portion 27 of one end of the rod 21 is inserted into the valve regulating member 57, the disk valve 55 that opens and closes the channel 44, the piston 17, the disk valve 50 that opens and closes the channel 43, and the valve regulating member 52. In this state, the nut 22 is screwed to the screw portion 29 of the mounting shaft portion 27 of the rod 21 formed on the opposite side of the main shaft portion 26. Accordingly, while the stepped surface 28 of the rod 21 abuts the valve regulating member 57 and the seat surface 53 of the nut 22 abuts the valve regulating member 52, the inner peripheries of the valve regulating member 57, the disk valve 55, the piston 17, the disk valve 50 and the valve regulating member 52 are clamped by the main shaft portion 26 of the rod 21 including the stepped surface 28 and the nut 22 including the seat surface 53. Accordingly, the valve regulating member 57, the disk valve 55, the piston 17, the disk valve 50 and the valve regulating member 52 are fastened to the rod 21. In other words, the nut 22 that is screwed to the screw portion 29 formed on one end of the rod 21 transmits axial force to the valve regulating member 57, the disk valve 55, the piston 17, the disk valve 50 and the valve regulating member 52, with the rod 21. Accordingly, the rod 21 to which the nut 22 is screwed functions as a bolt that clamps the valve regulating member 57, the disk valve 55, piston 17, the disk valve 50 and the valve regulating member 52.

A swaging process to be described later is performed on the nut 22 and the rod 21. Accordingly, prevention of the nut 22 from rotating on the rod 21, that is, loosening prevention, is accomplished.

A screw hole 75 that penetrates in the axial direction is formed in the center of the nut 22. A female screw portion 76 screwed to the mail screw portion 29 of the rod 21 is formed in the screw hole 75. The screw portion 76 has a uniform spiral shape before a swaging process. That is, the screw portion 76 is in a screw-processed condition as it is by cutting or roll threading before a swaging process. In other words, the effective range excluding both ends of the screw portion 76, before a swaging process, is that the outer diameter and the root diameter are all constant, and the pitch dimension (the axially moving distance per turn) is also constant.

The above-mentioned seat surface 53 is formed at one axial end of the nut 22 in the direction orthogonal to the axis. A tool mounting portion 78 on which a tool not shown for applying a fastening torque to the axial seat surface 53 is mounted is formed on the outer periphery of the nut 22. A thin portion 79 having an annular shape with a thickness radially thinner than that of the tool mounting portion 78 is formed adjacent to the outer periphery of the nut 22 on the opposite side of the seat surface 53 of the tool mounting portion 78.

The tool mounting portion 78 has a regular hexagonal shape concentric with the central axis of the screw hole 75. Although not shown, a tool such as an impact wrench is mounted on the outer circumferential surface 81 of the tool mounting portion 78. Before a swaging process, the thin portion 79 has a cylindrical shape in which the outer circumferential surface 83 of the thin portion 79 is concentric with the central axis of the screw hole 75. The radius of the outer circumferential surface 83 is smaller than the minimum radius of the outer circumferential surface 81 of the tool mounting portion 78. Meanwhile, a stepped portion 84 expanding outward in the radial direction rather than the outer circumferential surface 83 of the thin portion 79 is formed in the end portion of the tool mounting portion 78 on the side of the thin portion 79 in the direction orthogonal to the axis by the outer circumferential surface 83. A chamfered edge 85 of a tapered shape having a diameter becoming smaller as separating from the tool mounting portion 78 in the thin portion 79 of the outer circumferential surface 83 on the opposite side of the tool mounting portion 78 before the swaging process is performed. An end surface portion 86 opposite to the tool mounting portion 78 of the thin portion 79 is formed in parallel with the seat surface 53. Meanwhile, the outer circumferential surface 83 may have a polygon which becomes a plane portion in correspondence to the swaging place.

The nut 22 is screwed to the male screw portion 29 of the mounting shaft portion 27 of the rod 21 so as to apply the axial force to the valve regulating member 57, the disk valve 55, the piston 17, the disk valve 50 and the valve regulating member 52 in the screwing process before the swaging process, and is fastened with a predetermined fastening torque. Meanwhile, the male screw portion 29 of the mounting shaft portion 27 to which the nut 22 is screwed also has a uniform spiral shape before the swaging process. That is, the male screw portion 29 before the swaging process is in a screw-processed condition by cutting or roll threading. In other words, the effective range excluding both ends of the male screw portion 29 is that the outer diameter and the root diameter are all constant and the pitch dimension is also constant.

With a predetermined axial force applied by the nut 22 to the valve regulating member 57, the disk valve 55, the piston 17, the disk valve 50 and the valve regulating member 52 by the screwing process, the front end portion 88 opposite to the main shaft portion 26 of the mounting shaft portion 27 protrudes from the nut 22 to the opposite side of the main shaft portion 26. Meanwhile, the portion of the mounting shaft portion 27 that protrudes from the nut 22 also has the male screw portion 29.

Next, a fastening method, which is performed in the swaging process after the above-mentioned screwing process and in which the nut 22 is fastened to the rod 21 in a screwed state, will be described.

Figure 3:
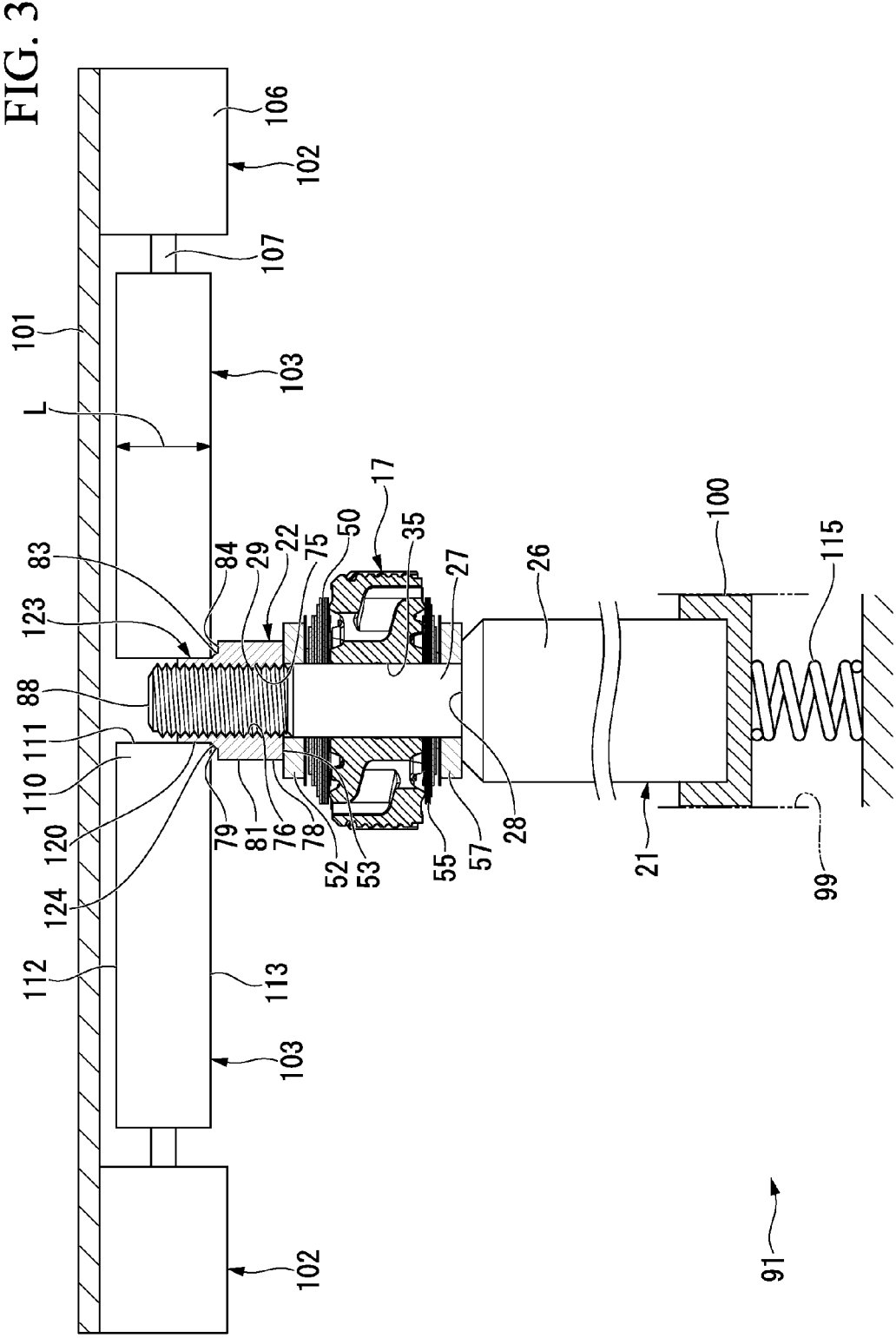
FIG. 3 is a cross-sectional view showing a major portion of the shock absorber, which is the cylinder device according to the first embodiment of the present invention, and the swaging device.

After the above-described screwing process, the nut 22 is screwed, and the rod 21 that the valve regulating member 57, the disk valve 55, the piston 17, the disk valve 50 and the valve regulating member 52 are mounted on is set in a predetermined set position of a swaging device 91 shown in FIG. 3. The swaging device 91 has a work support base 100, a device board 101 installed above the work support base 100, a plurality of cylinders 102 mounted on the bottom surface of the device board 101, and a plurality of punches 103 mounted on each of the cylinders 102. The work support base 100 supports the rod 21 at a position opposite to the nut 22 to maintain the rod 21 and the nut 22 in a vertical state at a predetermined set position. The plurality of cylinders 102 serve as a driving source. The plurality of punches 103 are reciprocated by each of the cylinders 102. The work support base 100 is made movable only in the vertical direction by a guide 99.

Figure 4:
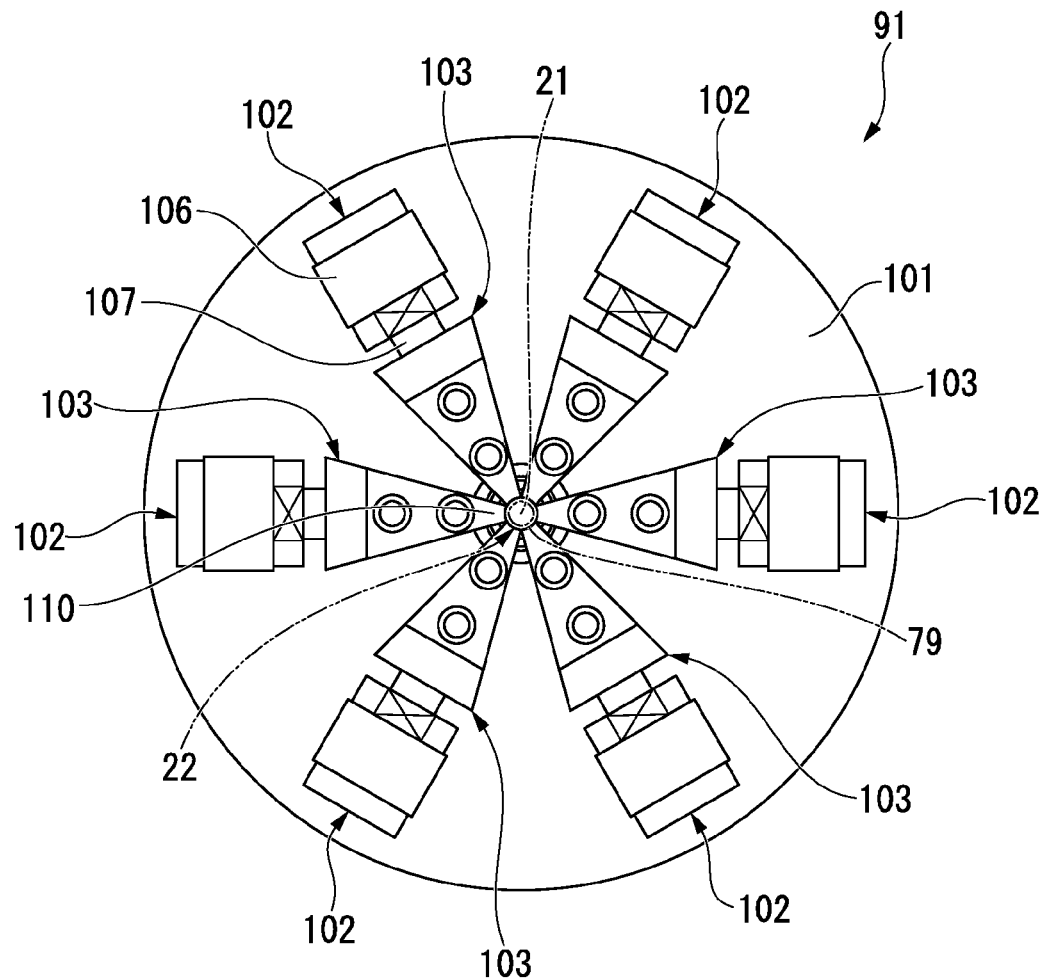
FIG. 4 is a bottom view showing the major portion of the shock absorber, which is the cylinder device according to the first embodiment of the present invention, and the swaging device.

As shown in FIG. 4, specifically six cylinders 102 and six punches 103 are installed. The six cylinders 102 are driven by hydraulic pressure, for example. The cylinders 102 each include a cylinder body 106 and a reciprocating rod 107 that reciprocates in linear motion with respect to the cylinder body 106. All the cylinders 102 are mounted on the device board 101 at the cylinder bodies 106, with the reciprocating rods 107 facing the set position of the rod 21 and the nut 22. These cylinders 102 are disposed at circumferentially uniform positions so as to encircle the set position, at positions equidistant from the set position of the rod 21 and the nut 22. In other words, the cylinders 102 are disposed radially with the set position as the center.

Figure 5:
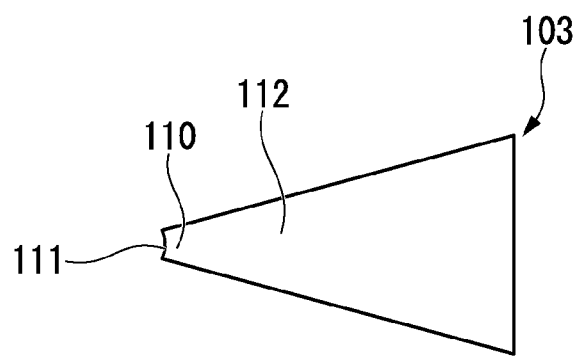
FIG. 5 is a plan view showing a punch of the swaging device.

The punch 103 has a roughly triangular column shape that becomes almost an isosceles triangle as seen on a plane as shown in FIG. 5. The punch 103 has a concave shape that is curved such that a front end surface (a contact surface) 111 of an apex portion 110 that becomes an acute angle as seen on a plane makes a constant circular arc shape regardless of the height direction position. The front end surface 111 extends so as to cross both of the surface 112 and the bottom surface 113 of the punch 103 shown in FIG. 3.

All the punches 103 are fixed to the reciprocating rods 107 of the cylinders 102 that correspond to each other on the opposite side of the apex portion 110. When each punch 103 is mounted on the corresponding cylinders 102 as above, the front end surfaces 111 of all the apex portions 110 are oriented to the set position of the rod 21 and the nut 22. These punches 103 match the positions in the axial direction of the rod 21 and the nut 22, so that they are disposed at radially uniform positions to encircle the set position of the rod 21 and the nut 22.

Thus, in the swaging device 91, the front end surfaces 111 of the six punches 103 are disposed respectively at the positions axially equal to the rod 21 and the nut 22 at circumferentially uniform positions of the rod 21 and the nut 22 supported by the work support base 100. Each of the front end surfaces 111 of the six punches 103 is parallel to the central axis of the rod 21 and the nut 22. With this state maintained, the front end surfaces 111 of all the punches 103 make linear motion in the radial direction orthogonal to the central axis of the rod 21 and the nut 22.

The work support base 100 is biased by a spring 115 to maintain the rod 21 and the nut 22 at the set position of reference height of the device board 101. With the rotation and radial movement of the rod 21 and the nut 22 disabled by the guide 99, the work support base 100 can move the rod 21 and the nut 22 from the set position of reference height in the axial direction to the opposite side of the device board 101 against the biasing force of the spring 115. Meanwhile, instead of the spring 115, urethane or rubber may be used for biasing.

With the rod 21 and the nut 22 maintained at the set position of reference height, as shown in FIG. 2, the bottom end portions of the front end surfaces 111 of all the punches 103 match the axial positions in an axial direction of the rod 21 and the nut 22 at an intermediate predetermined position of the stepped surface 84 of the thin portion 79 of the nut 22. Further, the top end portion of the front end surface 111 is positioned upward from the end portion of the thin portion 79 of the nut 22 opposite to the tool mounting portion 78. In other words, with the rod 21 and the nut 22 maintained at the set position of reference height, the front end surfaces 111 of all the punches 103 superimpose the axial positions in the axial direction of the rod 21 and the nut 22 between the stepped surface 84 of the thin portion 79 and the end portion opposite to the tool mounting portion 78.

The swaging process is performed using the swaging device 91. That is, in the swaging process, the rod 21 is mounted on the work support base 100 shown in FIG. 3, in a standby state in which all the punches 103 are positioned at the retracting ends. Accordingly, the rod 21 and the nut 22 are set at the set position of reference height. In this state, a driving controller, which is not shown, drives all cylinders 102 simultaneously at a constant velocity. Accordingly, all the punches 103 having the same shape disposed at circumferentially uniform positions are pressed by equal pressing force to the outer circumference 83 of the thin portion 79 of the nut 22 simultaneously from the outside in the radial direction. Thus, the thin portion 79 is uniformly swaged from the outer circumferential direction to the center of the rod 21.

Figure 6:
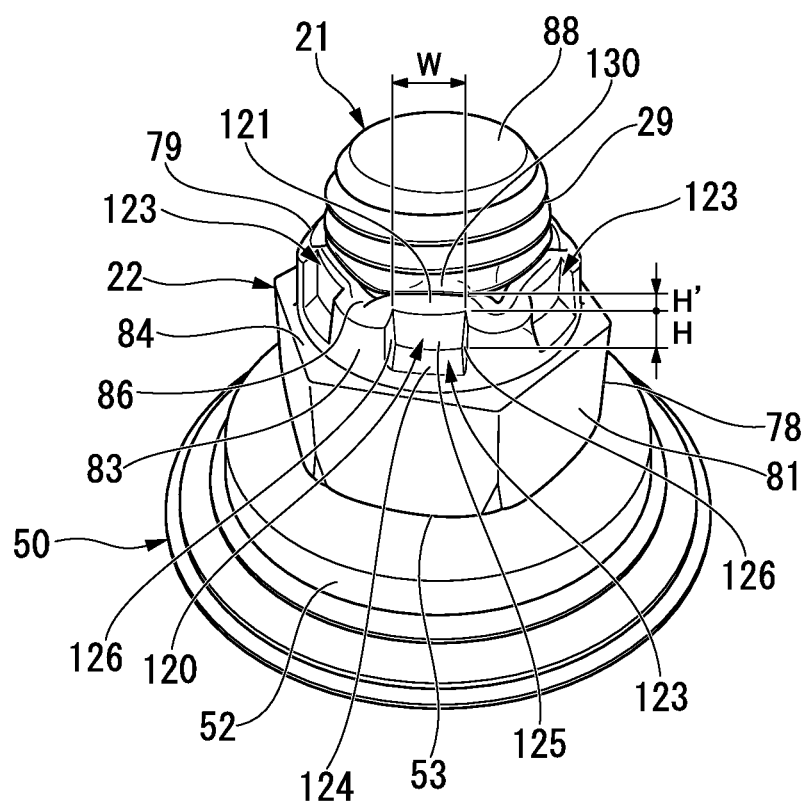
FIG. 6 is a partially enlarged perspective view showing a major portion of the shock absorber, which is the cylinder device according to the first embodiment of the present invention.
Figure 7:
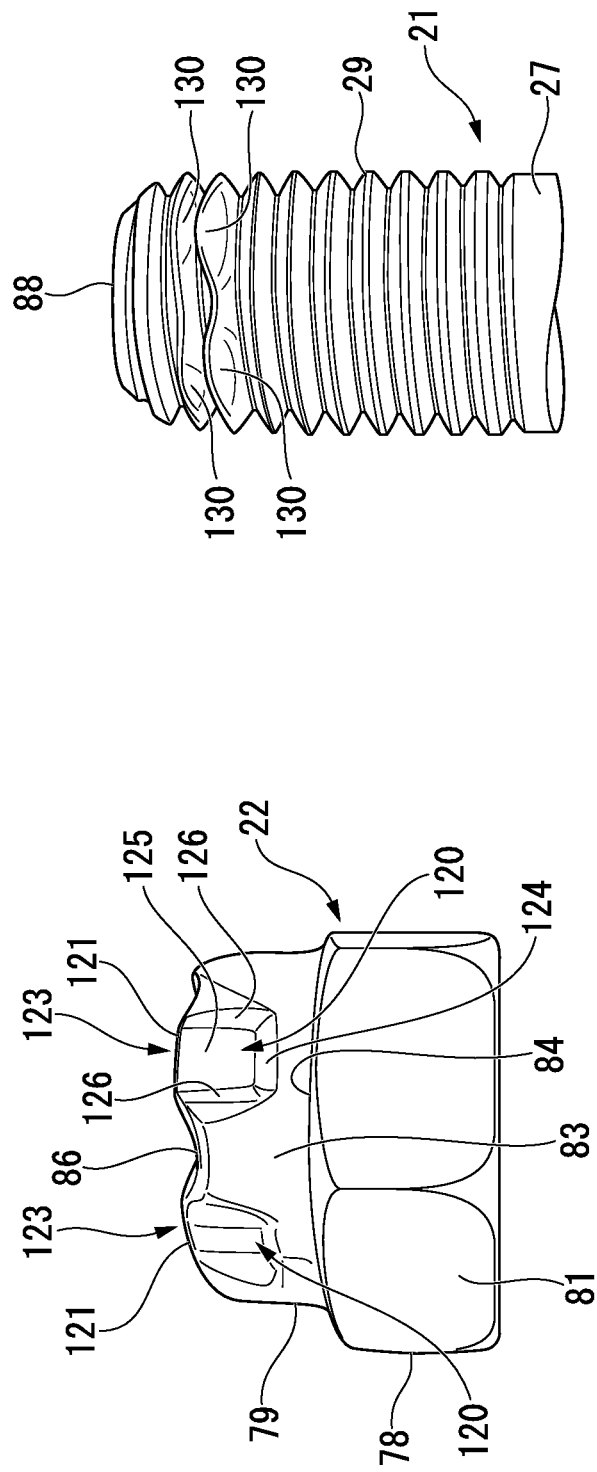
FIG. 7A is a partial exploded view of a nut showing a major portion of the shock absorber, which is the cylinder device according to the first embodiment of the present invention.
FIG. 7B is a partial exploded view of a rod showing a major portion of the shock absorber, which is the cylinder device according to the first embodiment of the present invention.

By this swaging process, the thin portion 79 of the nut 22 is plastic-deformed according to the shape of the apex portion 110 of each punch 103. As a result, a plurality of, specifically six, recessed portions 120 are formed partially in the circumferential direction on the outer circumference 83 of the thin portion 79 at circumferentially uniform positions, as shown in FIGS. 6 and 7A. The recessed portion 120 is recessed radially inward to the center of the rod 21 and the nut 22. Further, at all the positions of the recessed portions 120, the surface material of the thin portion 79 that is pushed aside as the recessed portions 120 is formed, and is flowed (deformed) from the thin portion 79 to the opposite side of the tool mounting portion 78 in the axial direction of the rod 21 and the nut 22. The flowed material extends to the front end of the rod 21 to form an extended portion 121 extending from an end surface portion 86 that remains with little deformation from before the swaging process of the thin portion 79. The extended portion 121 also has a shape that is recessed radially inward to the center of the rod 21 and the nut 22 so as to be continuous with the recessed portions 120. That is, the swaged portion 123, which is formed when the thin portion 79 of the nut 22 is swaged by the punch 103 partially in the circumferential direction of the rod 21 and the nut 22, has the above-mentioned recessed portion 120 and the extended portion 121. A plurality of, specifically six, which is the same as the number of punches 103, swaged portions 123 are formed at positions uniform in the circumferential direction of the rod 21 and the nut 22. Meanwhile, the number and layout of the swaged portions 123 are set as design items such as the product size and necessary torque need to loosen the nut.

In addition, the work support base 100 shown in FIG. 3 moves downward against the biasing force of the spring 115 according to the progress of the swaging process. As a result, an inclined surface 124, which is inclined so as to be separated axially by the punch 103 from the tool mounting portion 78 as much as the inside in the radial direction toward the tool mounting portion 78 of the recessed portion 120, is formed. As the work support base 100 moves as above, the extended portion 121 shown in FIGS. 6 and 7A is extended smoothly on the opposite side of the tool mounting portion 78 along the axial direction of the rod 21 and the nut 22.

As shown in FIG. 7A, the bottom 125 of the swaged portion 123 is formed from the recessed portion 120 to the extended portion 121. Further, a pair of side 126, which extend radially outward from the nut 22 from the edge portion of both ends in the circumferential direction of the nut 22 of the bottom 125, are formed from the recessed portion 120 to the extended portion 121 of the swaged portion 123.

In addition, the front end surface 111 of the punch 103 shown in FIG. 3, which is a surface in contact with the thin portion 79, has a concave shape as shown in FIG. 5. Accordingly, as shown in FIG. 6, the bottom 125 of the swaged portion 123 has a convex surface which projects in a cylindrical surface shape outward in the radial direction of the rod 21 and the nut 22, along the circumferential direction and axial direction of the rod 21 and the nut 22. In other words, the bottom 125 of the recessed portion 120 has a cylindrical shape following the outer circumference 83 remaining between the recessed portions 120 of the thin portion 79. Further, a pair of the side 126 of the swaged portion 123 follow the radial direction and axial direction of the rod 21 and the nut 22.

All the swaged portions 123 are pressed out radially inward from the thin portion 79 as described above. That is, the swaged portions 123 protrude toward the central axis of the rod 21 and the nut 22 from the inner diameter of the portion other than the swaged portion 123 of the thin portion 79. Accordingly, the swaged portions 123 are strongly pressed and closely adhered to the screw portion 29 of the rod 21. Especially, the side of the front end portion 88 of the screw portion 29 is deformed partially in the circumferential direction and inward in the axial direction and radial direction to form a deformed portion 130 and is closely adhered to the deformed portion 130.

As shown in FIG. 7B, the deformed portion 130 that is formed on the screw portion 29 partially in the circumferential direction is deformed in such a way that the screw outer diameter becomes smaller than the portion other than the deformed portion 130. The deformed portion 130 is deformed in such a way that it crumbles mainly toward the front end portion 88 in the axial direction of the rod 21. That is, in the screw portion 29 of the rod 21, the deformed portion 130 deformed radially inward by the swaging process is formed partially in the circumferential direction. A plurality of, specifically six, which is the same number of swaged portions 123, deformed portions 130 are formed by the punches 103 simultaneously with the swaged portions 123 at the uniform positions in the circumferential direction. In this regard, the swaged portion 123 deforms the screw portion 29 of the rod 21 partially in the circumferential direction also by the extended portion 121 extending to the front end of the rod 21.

Accordingly, the screw portion 29 of the rod 21 is deformed into a corrugated shape by the deformed portion 130. This corrugated screw portion 29 and the screw portion 76 of the nut 22 interferes to inhibit the rotation of the nut 22.

In addition, the length L in the axial direction of the rod 21 and the nut 22 of the apex portion 110 including the front end surface 111 of the punch 103 shown in FIG. 3 is set as a length L equal to or greater than the length H+H' of the swaged portion 123, which is the sum of the length H of the recessed portion 120 after the swaging process and the length H' of the extended portion 121 of the thin portion 79 shown in FIG. 6 (that is, L≥H+H'). In other words, the length L of the apex portion 110 of the punch is set in such a way that a portion positioned radially outward from the bottom 125 does not occur on the opposite side to the tool mounting portion 78 of the swaged portion 123. Accordingly, it is configured so as to reliably form the extended portion 121 of the swaged portion 123 and the deformed portion 130 of the screw portion 29. Further, the swaging amount of the punch 103 and the radial thickness of the thin portion 79 are set in such a way that the length H' of the extended portion 121 extending to the front end of the rod 21 of the nut 22 becomes longer than the pitch dimension (the axially moving distance per turn) of the screw portion 29 of the rod 21. Accordingly, the extended portion 121 should be in contact with at least one turn portion of the screw portion 29 and the deformed portion 130 is formed in this one turn portion. Meanwhile, a circumferential width of the bottom 125 of the swaged portion 123 is illustrated by W in FIG. 6.

The above embodiment shows an example in which the length H' of the extended portion 121 is made longer than the pitch dimension (the axially moving distance per turn) of the screw portion 29 of the rod 21. However, by making the length H' of the extended portion 121 longer than a length of the "pitch dimension" divided by "the number of swaged portions 123", at least one extended portion 121 can form the deformed portion 130. Therefore, the minimum effect can be obtained.

Figure 8:
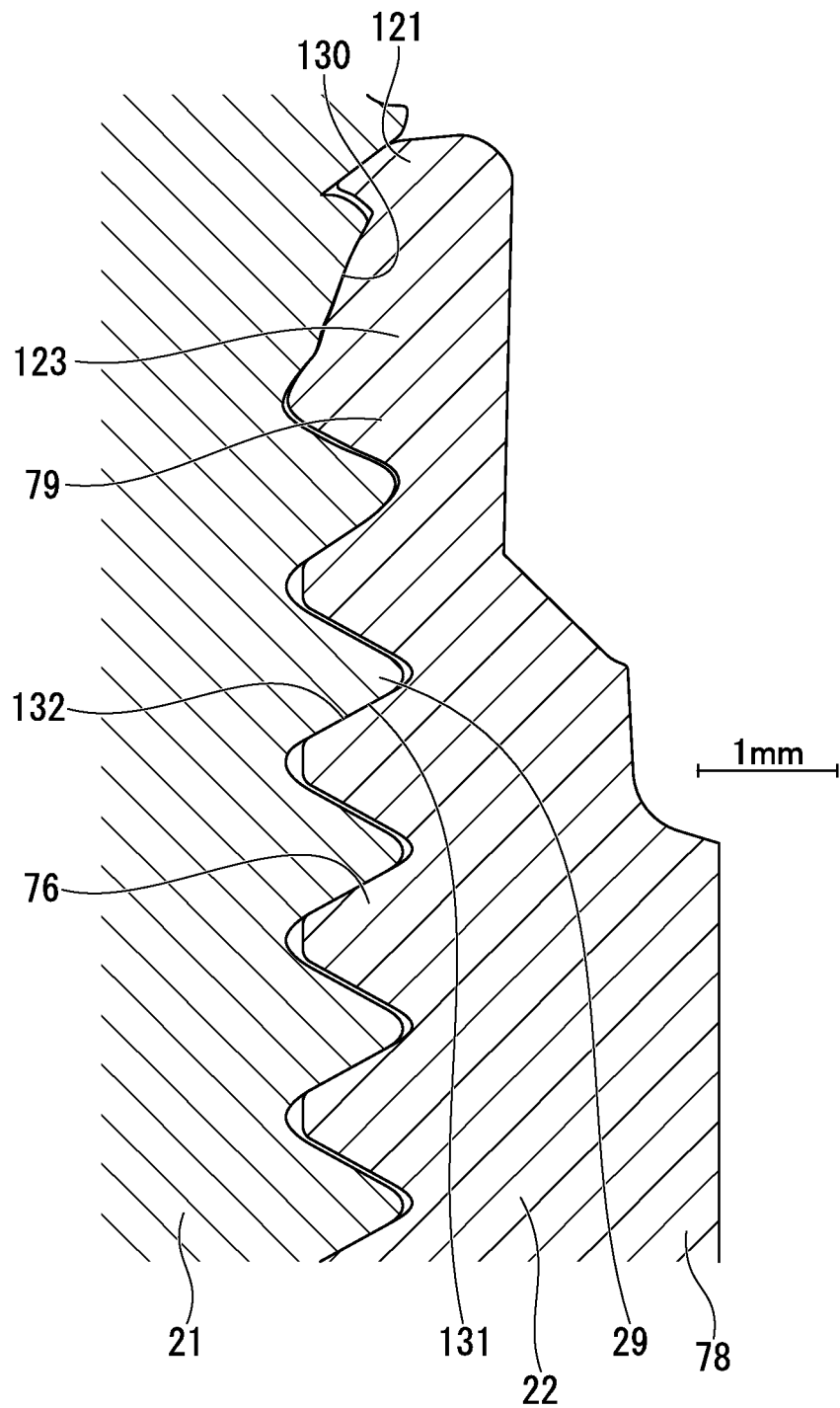
FIG. 8 is a cross-sectional view showing a major portion of the shock absorber, which is the cylinder device according to the first embodiment of the present invention.

In the nut 22 in which the swaging process is performed as described above, a plurality of swaged portions 123 are formed in the thin portion 79 in the circumferential direction. The extended portion 121, which extends as the thickness of the thin portion 79 flows toward the front end of the rod 21 partially in the circumferential direction, is formed in each swaged portion 123. Each swaged portion 123 deforms the screw portion 76 as shown in FIG. 8 to be closely adhered to the screw portion 29 of the rod 21. At this time, as shown in FIG. 6, the extended portion 121 has a smoothly curving and projecting shape so that the circumferential middle portion of the nut 22 protrudes in an axial direction from both sides. Further, in the rod 21 on which the swaging process is performed, as shown in FIG. 8, the deformed portion 130 is formed in the portion closely adhered to the swaged portion 123 of the screw portion 29.

As the screw portion 29 of the rod 21 and the screw portion 76 of the nut 22 are partially deformed in the circumferential direction, the closely-adherence area is increased, and at the same time the spirals of the screw portions 29 and 76 are deformed, so that the relative rotation of the screw portions 29 and 76 is regulated. Accordingly, the nut 22 is prevented from being loosened from the rod 21. However, even in this state, it is possible to loosen the nut 22 with the deformation of the deformed portion 130 restored by mounting a tool on the tool mounting portion 78 of the nut 22 to turn it by a large torque. The torque at which the nut 22 starts to be loosened increases remarkably compared with the case in which the swaging process is not performed. Therefore, a sufficient loosening prevention effect may be obtained.

In addition, before the swaging process, a lower surface portion 131 shown in FIG. 8 of the spiral shape of the screw portion 29 of the rod 21 comes into contact with an upper surface portion 132 having a spiral surface of the screw portion 76 of the nut 22 and generates residual axial force, like a normal screw. When the swaging process is performed, the screw portion 76 at the position of the swaged portion 123 of the nut 22 forms the deformed portion 130 in the screw portion 29 of the rod 21 as shown in FIG. 8, and comes into contact with the screw portion 29 in almost the whole region. At this time, the unswaged portion maintains the state before swaging. Accordingly, deviation in residual axial force generated before and after swaging is suppressed to be small.

The shock absorber described in the above-described Japanese Unexamined Patent Application, First Publication No. 2007-46666 is configured so as to prevent the nut from loosening by deforming the outer circumferential portion of the nut to plastic-deform the spiral in the front end portion of the rod. Through such a configuration, the torque need to loosen can be increased. However, there is a need to further increase the torque need to loosen.

In addition, there is also a technique to prevent the nut from loosening by using a pre-coating nut with adhesives coated in the screw portion of the nut. When this pre-coating nut is used, if contamination such as grease remains in the screw portion of the rod, the adhesive strength of the adhesive agent could be insufficient, so the torque need to loosen cannot be increased. Moreover, the pre-coating nut itself is expensive.

Compared with this, in the fastening method according to the present embodiment and the shock absorber employing the same, the swaging process for forming the swaged portion 123 by swaging with the punches 103 from the outer circumferential direction is performed at a plurality of places of the circular thin portion 79 formed on the opposite side to the seat surface 53 of the tool mounting portion 78 of the nut 22. By the swaging process, the surface material of the thin portion 79 is made to flow so as to extend to the front end of the rod 21 partially in the circumferential direction to closely adhere to the screw portion 29 of the rod 21. Accordingly, it is possible to increase the torque need to loosen while suppressing cost increase. Thus, by increasing the torque need to loosen, it is possible to stabilize the residual axial force applied to the piston 17 or the disk valves 50 and 55 and to suppress deviation of the damping force.

The swaging process is performed by disposing a plurality of punches 103 uniformly in the circumferential direction and pressing these punches 103 in the thin portion 79. Accordingly, by changing the internal state of the nut 22 into a compression residual stress field, it is possible to generate tension force between the rod 21 and the nut 22 and make it into a firmly adhered state. Furthermore, it is possible to form a plurality of swaged portions 123 in a stable shape and size without deviation.

In addition, the punch 103 has a length equal to or greater than the length of the swaged portion 123 after the swaging process of the thin portion 79, with respect to the axial direction of the nut 22 and the rod 21. Accordingly, the swaged portion 123 can generally be closely adhered to the rod 21.

The screw portion 29 of the rod 21 is deformed into a corrugated shape partially in the circumferential direction by the swaged portion 123 including the extended portion 121 extending to the front end of the rod 21 of the nut 22. Accordingly, the torque need to loosen can be increased much more.

The length of the extended portion 121 extending to the front end of the rod 21 of the nut 22 is longer than the pitch dimension of the screw portion 29 of the rod 21. Accordingly, it is possible to closely adhere the extended portion 121 to the screw portion 29 regardless of the axial positional relationship of the screw portion 29 of the rod 21 and the extended portion 121. Accordingly, the torque need to loosen can be stably increased.

Figure 9:
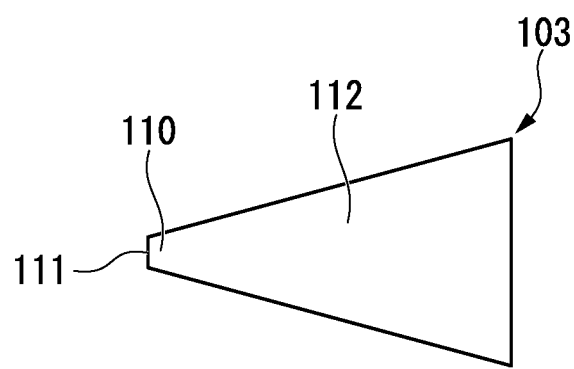
FIG. 9 is a plan view showing another example of the punch of the swaging device.
Figure 10:
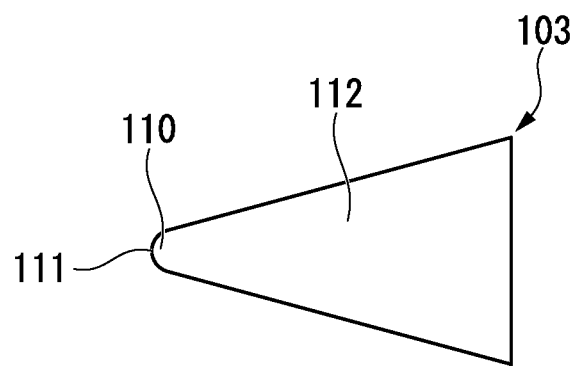
FIG. 10 is a plan view showing yet another example of the punch of the swaging device.

The front end surface 111 of the punch 103 which is a contact surface with the thin portion 79 has a concave surface shape. Accordingly, it is possible to cause the bottom 125 of the swaged portion 123 to follow the outer circumference 83 of the thin portion 79. Accordingly, it is possible to transmit the load of the punch 103 to the thin portion 79 using the whole surface of the front end surface 111. Accordingly, the surface pressure of the punch 103 is applied wholly to the front end surface 111, so the durability of the punch 103 can be improved. Further, the load applied to the punch 103 can also be lowered compared with, for example, a punch of a convex surface shape with the front end curved. Meanwhile, as shown in FIG. 9, it is also possible to make the front end surface 111 flat, which is the contact surface of the punch 103. Further, as shown in FIG. 10, it is also possible to make the front end surface 111, which is the contact surface of the punch, in an R-surface shape or a convex surface shape.

In addition, the work support base 100 moves the nut 22 toward the tool mounting portion 78 axially in the swaging process. Accordingly, it is possible to facilitate the forming of the extended portion 121 by the punch 103.

[Second Embodiment]

Next, a fastening method according to a second embodiment of the present invention and a shock absorber, which is a cylinder device employing the same, will be described with reference to FIGS. 11 to 18 focusing on the differences from the first embodiment. Meanwhile, the portions common with the first embodiment will be shown with the same names and the same numerals.

In the second embodiment, the screw thread in the exposed portion of the screw portion 29 not covered by the thin portion 79 of the nut 22 is deformed additionally from the first embodiment. In the second embodiment, when the nut 22 is screwed in the screwing process, the rod 21 that the valve regulating member 57, the disk valve 55, the piston 17, the disk valve 50 and the valve regulating member 52 are mounted on is set at a predetermined set position of the swaging device 91' shown in FIGS. 11 to 13.

Figure 12:
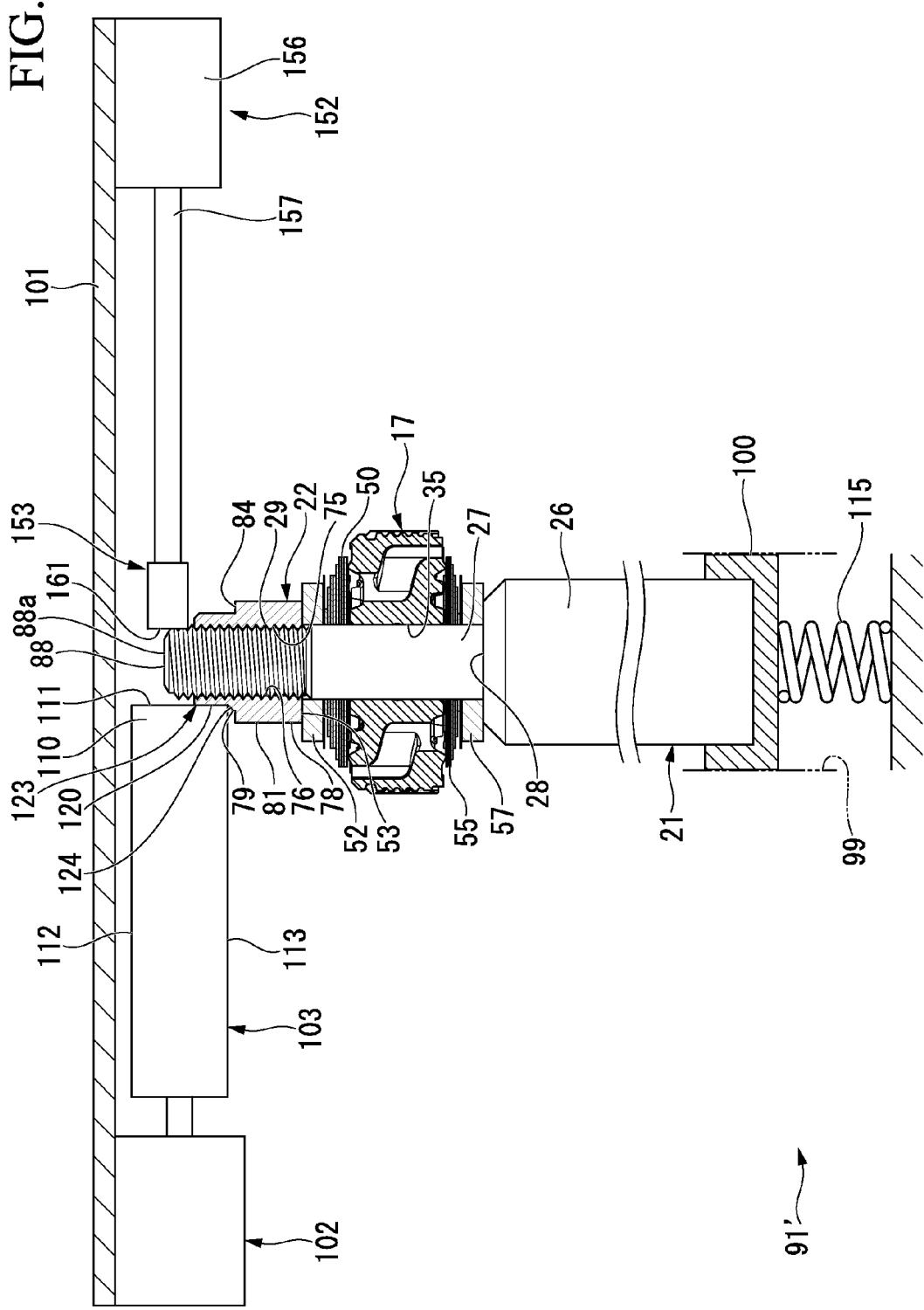
FIG. 12 is a cross-sectional view showing a major portion of the shock absorber, which is the cylinder device according to the second embodiment of the present invention, and the swaging device.
Figure 13:
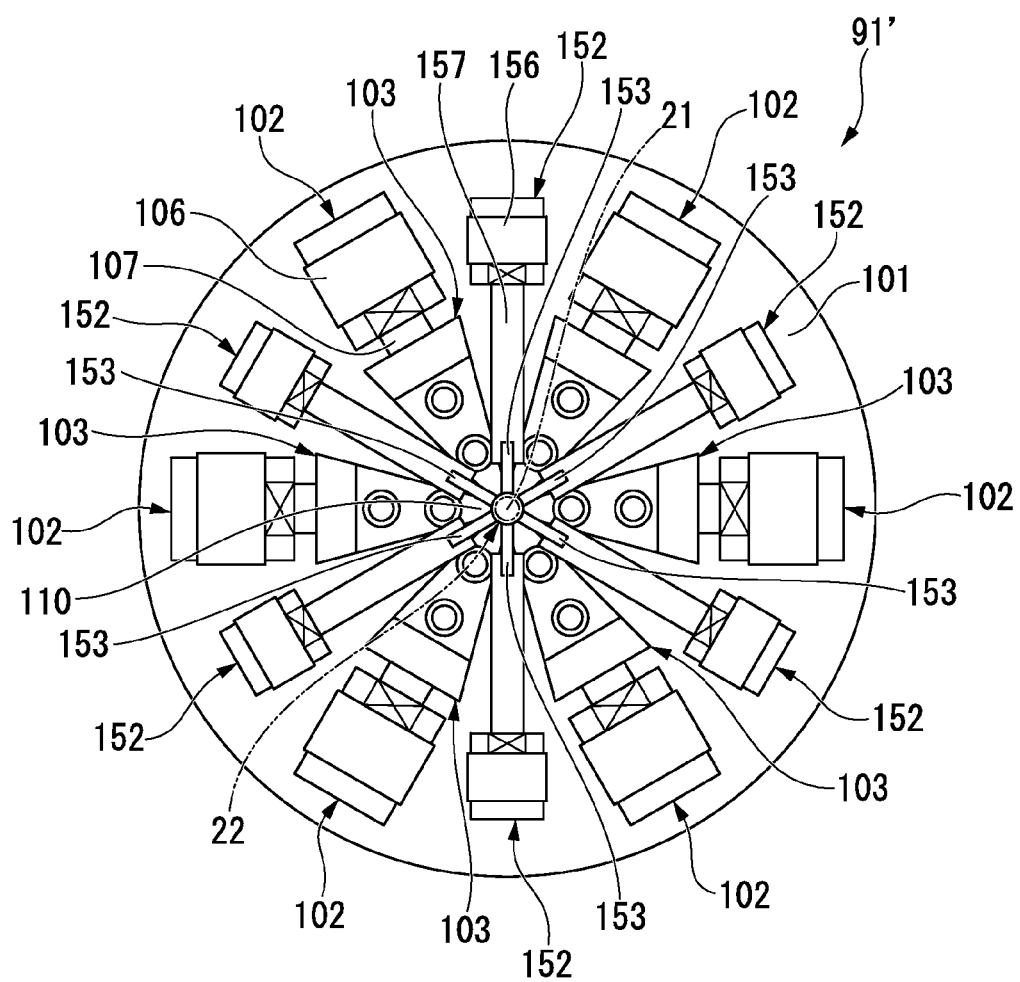
FIG. 13 is a bottom view showing the major portion of the shock absorber, which is the cylinder device according to the second embodiment of the present invention, and the swaging device.

Compared with the above-described swaging device 91, a cylinder 152 and a punch 153 are installed in the swaging device 91' in addition to the cylinder 102 and the punch 103 for swaging the thin portion 79 of the nut 22, as shown in FIG. 12. The cylinder 152 and the punch 153 swage the exposed portion of the screw portion of the rod 21 not covered with the nut 22. As shown in FIG. 13, the cylinder 152 and the punch 153 in the circumferential direction of the rod 21 and the nut 22 are disposed at positions shifted with respect to the cylinder 102 and the punch 103. Specifically, the cylinders 152 and the punches 153 are disposed respectively in the centers between the cylinders 102 and the punches 103 that neighbor each other in the circumferential direction of the rod 21 and the nut 22. Accordingly, specifically six cylinders 152 and punches 153 are installed.

The six cylinders 152 are driven by hydraulic pressure, for example. The cylinder 152 has a cylinder body 156 and a reciprocating rod 157 that reciprocates in linear motion with respect to the cylinder body 156. Each of these cylinders 152 is mounted on the cylinder body 156 fixed on the device board 101 with the reciprocating rod 157 facing the set position of the rod 21. These cylinders 152 are disposed at positions uniform in the circumferential direction so as to encircle the set position at positions equidistant from the set position of the rod 21. In other words, the cylinders 152 are disposed radially with the set position as the center.

Figure 11:
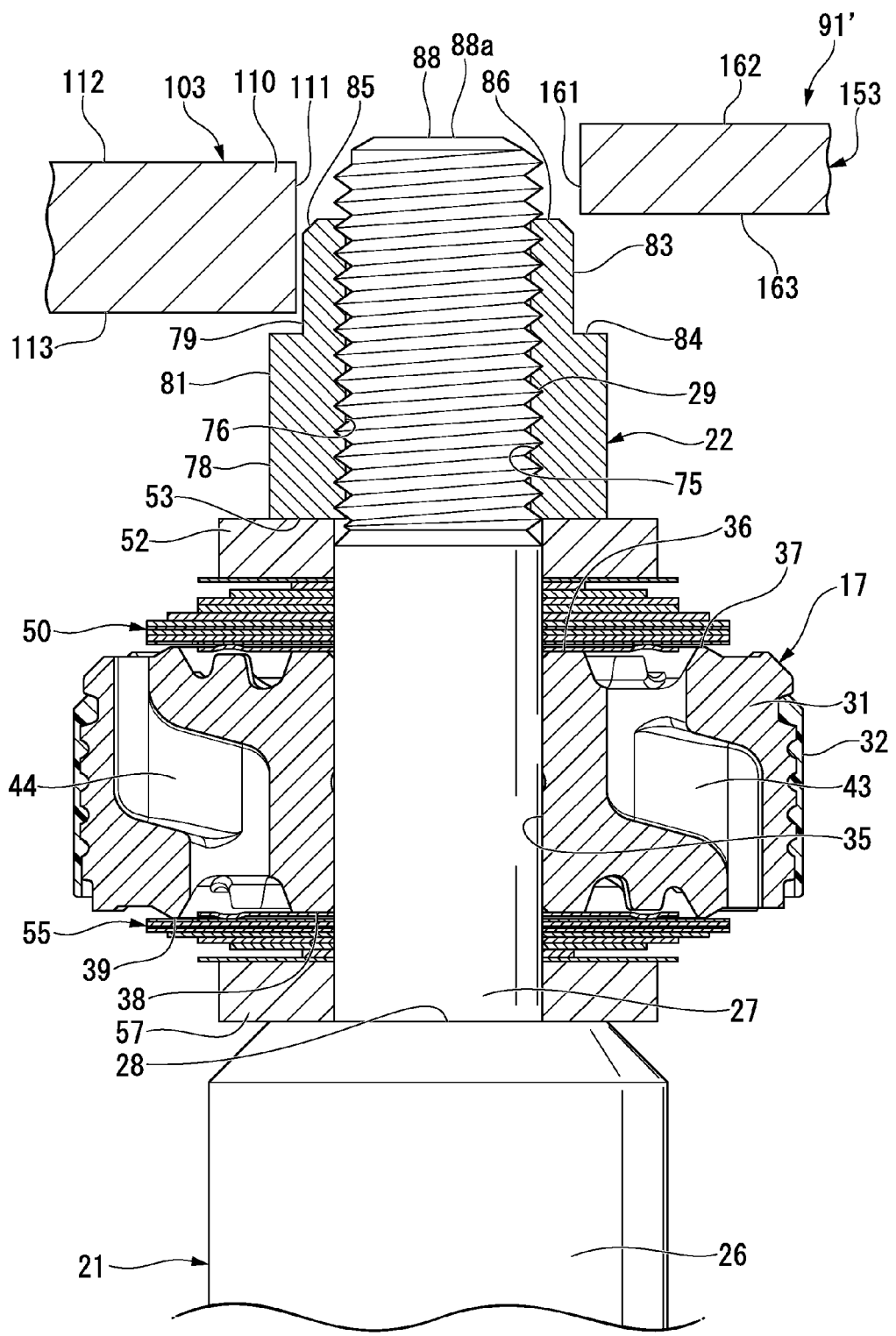
FIG. 11 is a partially enlarged cross-sectional view showing a major portion of a shock absorber, which is a cylinder device according to a second embodiment of the present invention, and a swaging device.

The punch 153 has a cuboid shape. The punch 153 has a plane shape in which the front end surface (the contact surface) 161 is disposed vertically lengthwise as shown in FIG. 11. The front end surface 161 is extended so as to cross both of the upper surface 162 and the bottom surface 163 of the punch 153. All the punches 153 are fixed to the reciprocating rods 157 of the corresponding cylinders 152 on the opposite side to the front end surface 161. In the state in which the punches 153 are mounted on the respectively corresponding cylinders 152 as above, the front end surfaces 161 of all the punches 153 face the set position of the rod 21. These punches 153 are also disposed at circumferentially uniform positions so as to encircle the set position of the rod 21, matching the positions in the axial direction of the rod 21.

Thus, in the swaging device 91', the six front end surfaces 161 of the punches 153 are respectively disposed at the same positions in the axial direction of the rod 21 at circumferentially uniform positions of the rod 21 supported by the work support base 100. The front end surfaces 161 are parallel to the central axis of the rod 21. With this state maintained, the front end surfaces 161 of all the punches 153 make linear motion in the radial direction orthogonal to the central axis of the rod 21.

In addition, as shown in FIG. 11, with the rod 21 and the nut 22 maintained at the set position of reference height, the bottom end portions of the front end surfaces 161 of all the punches 153 match the axial positions in the axial direction of the rod 21 at a predetermined position between the end surface portion 86 of the thin portion 79 of the nut 22 and the front end surface 88a of the front end portion 88 of the rod 21. Further, the top end portion of the front end surface 161 is positioned upward from the front end surface 88a of the rod 21.

In the swaging process performed using the swaging device 91', the rod 21 is mounted on the work support base 100 shown in FIG. 12, in a standby state in which all the punches 103 and all the punches 153 are positioned at the retracting ends. Accordingly, the rod 21 and the nut 22 are set at the set position of reference height. In this state, the driving controller, which is not shown, drives all the cylinders 102 simultaneously at an equal velocity. In parallel with this, all the cylinders 152 are driven at an equal velocity. Accordingly, the punches 103 of all the same shapes as the first embodiment press the thin portion 79 of the nut 22 simultaneously at equal pressing force from outside in the radial direction. By applying the force to the thin portion 79 from outside in the radial direction, the thin portion is uniformly swaged toward the center of the rod 21. In parallel with this, all the punches 153 of the same shape press the exposed portion of the screw portion 29 of the rod 21 simultaneously in the radial direction at equal pressing force from outside in the radial direction. By applying the force to the screw portion 29 from outside in the radial direction, the screw portion is swaged uniformly toward the center of the rod 21.

Figure 14:
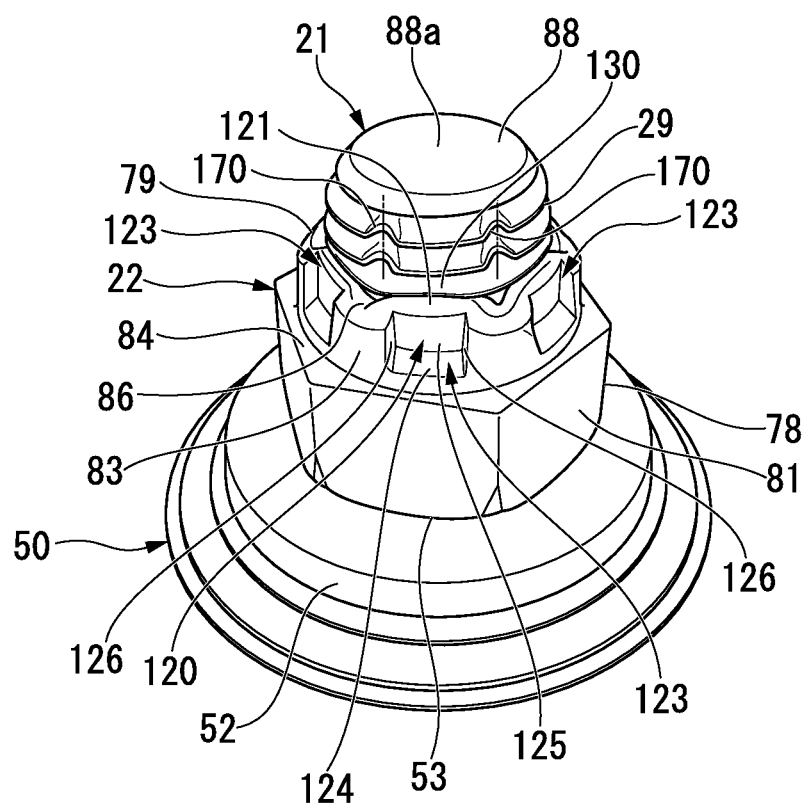
FIG. 14 is a partially enlarged perspective view showing a major portion of the shock absorber, which is the cylinder device according to the second embodiment of the present invention.

Through this swaging process, like the first embodiment, a plurality of, specifically six, swaging portions 123 are formed in the thin portion 79 of the nut 22 uniformly in the circumferential direction by the cylinders 102 and punches 103. With this, as shown in FIG. 14, a plurality of deformed portions 170 that plastic-deform the screw thread are formed by the cylinders 152 and punches 153 in the exposed portions of the thread portions of the rod 21 not covered with the thin portion 79 of the screw portion 29. Specifically, six deformed portions 170 are formed. The cylinders 152 and the punches 153 are disposed with the phases shifted in the circumferential direction of the rod 21 with respect to the cylinder 102 and the punch 103. Accordingly, the deformed portion 170 is formed in the circumferential position of the screw portion 29 corresponding to the portion in which the swaging is not performed by the cylinder 102 and the punch 103 of the thin portion 79 of the nut 22. In other words, the deformed portion 170 is formed in a position different from the swaged portion 123 of the thin portion 79 of the nut 22 in the circumferential direction of the rod 21. As a result, a plurality of deformed portions 170 is formed on the outer periphery of the screw portion 29 of the rod 21 at circumferentially uniform positions at intervals in the circumferential direction. Specifically, six deformed portions 170 are formed. The deformed portion 170 is also deformed in the axial direction of the rod 21 as it is recessed inward in the radial direction toward the center of the rod 21. These deformed portions 170 are all extended so as to be parallel in the axial direction of the rod 21.

According to the second embodiment described above, the deformed portion 170 that deforms the screw thread is formed in the exposed portion of the screw portion 29 not covered with the thin portion 79. Accordingly, even if the deformed portion 170 starts loosening after attempting the increase of torque need to loosen like the first embodiment, the deformed portion 170 serves as the friction resistance against the screw portion 76 of the nut 22, so the torque need to loosen can be maintained high. At this time, the friction resistance is increased at the deformed portion 170, especially at the deformed portion in which the swaged portion 123 of the screw portion 76 is formed.

By applying the force from the radial direction instead of the axial direction, the deformed portion 170 is formed on the screw portion 29. Accordingly, the torque need to loosen can be maintained satisfactorily high.

The deformed portion 170 is formed in the circumferential position of the screw portion 29 corresponding to the portion at which the swaging process of the thin portion 79 of the nut 22 is not performed (the circumferential position other than the position at which the swaged portion 123 is formed). Accordingly, there is no interference with the swaged portion 123, and the axial length of the rod 21 of the deformed portion 170 can be lengthened. Furthermore, production efficiency can be improved because the swaging of the deformed portion 170 can be performed simultaneously with the swaging of the swaged portion 123. Meanwhile, it is also possible to perform the swaging of the deformed portion 170 after the swaging of the swaged portion 123 without performing the swaging of the swaged portion 123 simultaneously. However, even in this case, it is preferable to perform this with the same device as the above swaging device 91' because the phase matching of the swaged portion 123 and the deformed portion 170 becomes difficult if swaged with a different device.

Here, the relations between a rotation angle and the torque when the nut is loosened were experimentally obtained for the case in which the nut 22 is fastened to the rod 21 with a predetermined torque without swaging, and the first embodiment and the second embodiment.

Figure 15:
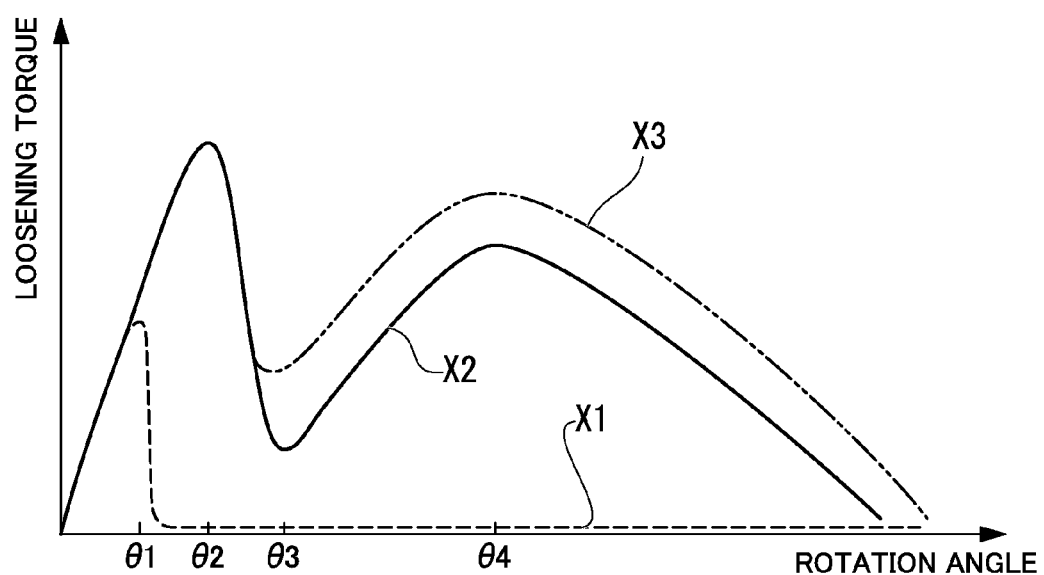
FIG. 15 is a characteristic diagram showing a relationship between a rotation angle and a torque need to loosen the nut of the shock absorber, which is the cylinder device according to the related art and the first and second embodiments of the present invention.

In the case of no swaging, as shown in FIG. 15 by dotted line X1, loosening occurs when the nut rotates (angle θ1) until the torque exceeds the maximum torque (torque need to loosen) generated from the friction force between the male screw and the female screw due to residual axial force and the friction force between the nut seat surface and a fastened object, and torque need to loosen, that is, residual axial force, is lowered rapidly. That is, when there is no swaging, the torque need to loosen relies on friction force due to residual axial force, so the torque need to loosen is lowered rapidly as the axial force is lowered.

In the case of the first embodiment, the swaged portion 123 and the deformed portion 130 are formed by plastic deformation in addition to the above-mentioned friction force. Therefore, as illustrated by solid line X2 in FIG. 15, the maximum torque need to loosen the nut 22 occurs at the angle θ2 larger than the above-mentioned angle θ1. The value of the maximum torque need to loosen the nut 22 also becomes higher than the case of no swaging. Further, because the swaged portion 123 and the deformed portion 130 generate resistance force to each other even if loosening occurs, the torque need to loosen the nut is not lowered rapidly like in the case of no swaging, but is lowered gradually, and becomes an initial dropout preventing torque (angle θ3). Further, if the nut 22 is loosened and rotates continuously, the swaged portion 123 deforms the screw portion 29 that is not deformed rather than the deformed portion 130. Thus, resistance force occurs successively as the deformed screw portion 29 is returned to the original state by the portion that is not deformed rather than the swaged portion 123 of the nut 22. Accordingly, the torque need to loosen (a dropout preventing torque) rises gradually, so the swaged portion 123 yields and wears (angle θ4) and the torque need to loosen is lowered after that and disappears.

In the case of the second embodiment, the deformed portion 170 is formed by plastic deformation additionally from the first embodiment. Therefore, the deformed portion 170 serves as the resistance against rotation of the nut 22, and the torque need to loosen including the initial dropout preventing torque after loosening occurs in the nut 22 can be increased more than in the first embodiment as shown by two dotted chain line X3 in FIG. 15.

Figure 16:
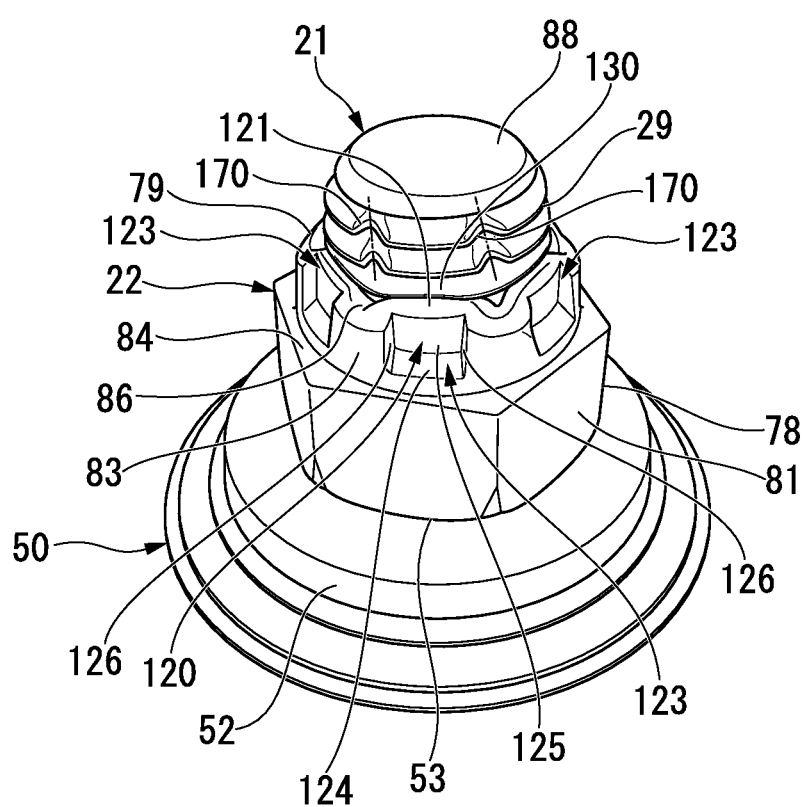
FIG. 16 is a partially enlarged cross-sectional view showing a major portion of a modified example of the shock absorber, which is the cylinder device according to the second embodiment of the present invention.

Although not shown, in the second embodiment, a plurality of front end surfaces 161 (the contact surfaces) of the punches 153 may be disposed in lengthwise inclination with respect to the center line of the rod 21 so as to be orthogonal to the lead direction of the screw portion 29. Accordingly, as shown in FIG. 16, the deformed portion 170 extends in the direction inclined with respect to the axial direction of the rod 21 and orthogonal to the lead direction of the screw portion 29.

Figure 17:
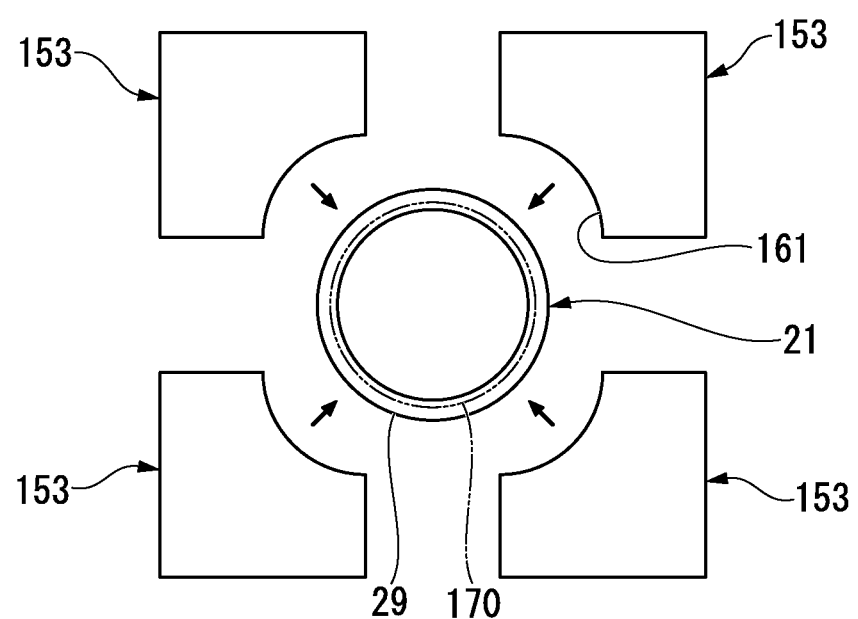
FIG. 17 is a bottom view showing a major portion of a modified example of the shock absorber, which is the cylinder device according to the second embodiment of the present invention, and the swaging device.

In addition, in the second embodiment, as shown in FIG. 17, if a plurality of punches 153 includes front end surfaces 161 having circular arc shapes is prepared, and these move toward the center of the rod 21, they may be connected in an annular form. Accordingly, it is possible to form the deformed portion 170 in succession to the whole periphery of the screw portion 29 and remove the thread of the screw portion 29.

Figure 18:
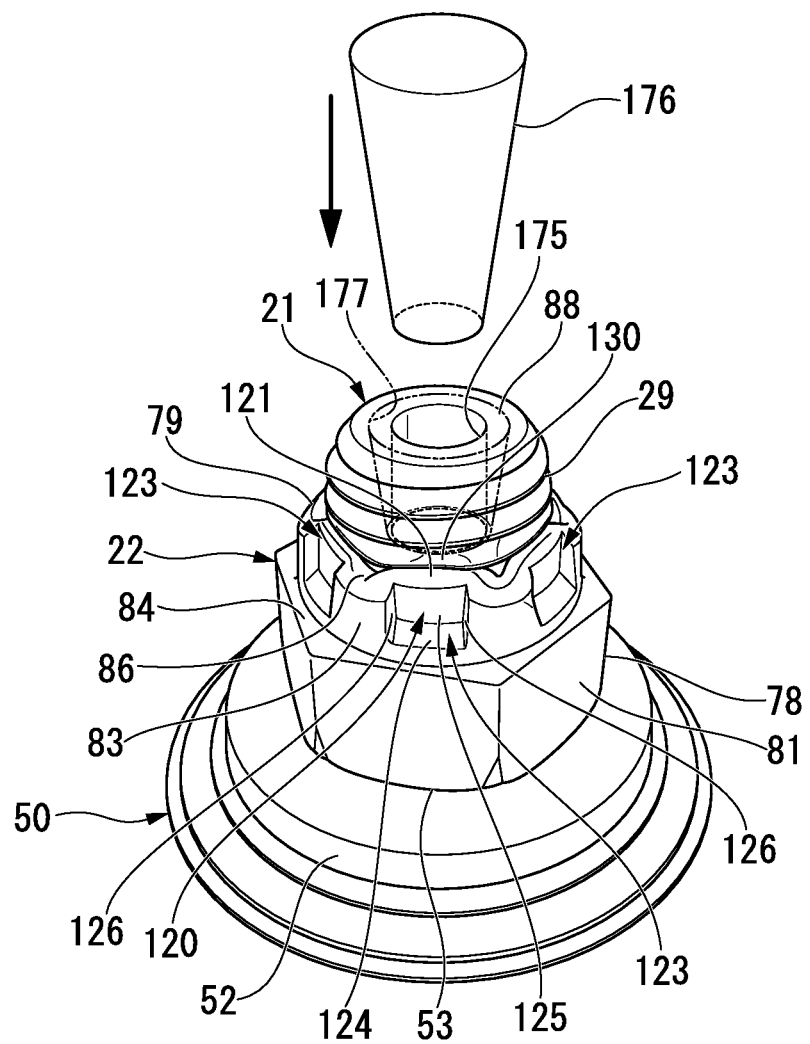
FIG. 18 is a partially enlarged cross-sectional view showing a major portion of the modified example of the shock absorber, which is the cylinder device according to the second embodiment of the present invention, and the swaging device.

Further, in the second embodiment, as shown in FIG. 18, a hole portion 175 is formed in the radial center of the front end portion 88 of the rod 21 and the hole portion 175 is swaged with a tapered shape tool 176 so as to expand the hole portion 175, and this may be plastic-deformed by applying a force to the screw portion 29 from the radial inside while forming a tapered surface 17 7 in the hole portion 175.

Meanwhile, in the second embodiment, forming the deformed portion 170 in addition to the first embodiment is illustrated, but it is possible to maintain the torque need to loosen higher than when loosening prevention is not performed by merely performing the process of the second embodiment without performing the process of the first embodiment, although this is inferior to the effect of the second embodiment.

In the above embodiments, the method of fastening the nut 22 to the rod 21 was described with the shock absorber used as a suspension strut for an automobile as an example. This is because the utility value is especially high since the loosening force is added to the nut 22 through the piston 17 as the cylinder 11 rotates when the suspension strut installed in the front is steered. However, the fastening method of the present embodiment can be applied to the method of fastening the nut to the bolt in other various structures.

The above-described embodiments are a fastening method for fastening a nut to a bolt by screwing. The nut is formed with a tool mounting portion on a seat surface side. An annular thin portion is formed on the tool mounting portion opposite to the seat surface of the nut. The swaging process, in which a plurality of places of the thin portion are swaged with punches from an outer circumferential direction, is performed, so that a surface material of the thin portion is flowed so as to extend to the front end of the bolt partially in the circumferential direction, to be closely adhered to a screw portion of the bolt. Thus, the swaging process for swaging with punches from the outer circumferential direction is performed on a plurality of places of the annular thin portion formed in the nut tool mounting portion opposite to the seat surface. Accordingly, the thickness of the thin portion is flowed so as to extend to the front end of the bolt partially in the circumferential direction to closely adhere it to the screw portion of the bolt. Therefore, it is possible to increase the torque need to loosen while suppressing cost increase. Thus, by increasing the torque need to loosen, it is possible to stabilize the residual axial force imparted to the piston or the disk valve and suppress the deviation of damping force.

The screw portion of the bolt is deformed partially in the circumferential direction by an extended portion of the nut extending to the front end of the bolt. Accordingly, the torque need to loosen can be increased much more.

The length of the extended portion of the nut extending to the front end of the bolt is longer than a length obtained by dividing a pitch dimension of the screw portion of the bolt by a number of swaged portions. Accordingly, the torque need to loosen can be increased much more.

The length of the extended portion of the nut extending to the front end of the bolt is longer than the pitch dimension of the screw portion of the bolt. Therefore, it is possible to closely adhere the extended portion to the screw portion regardless of the radial positional relations of the screw portion of the rod and the extended portion. Accordingly, it is possible to increase torque need to loosen stably.

A deformed portion with a deformed screw thread is formed on the exposed portion not covered with the thin portion of the screw portion. Therefore, the torque need to loosen is increased, and even if loosening starts, the torque need to loosen can be maintained high because the deformed portion serves as the resistance against the swaged portion of the nut.

The deformed portion is formed by applying a force to the screw portion in the radial direction. Accordingly, it is possible to maintain a satisfactorily high loosening torque.

The deformed portion is formed at a position in a circumferential direction of the screw portion corresponding to a portion on which the swaging process of the thin portion is not performed. Accordingly, there is no interference with the portion formed by the swaging process of the thin portion, and it is possible to lengthen the axial length of the rod of the deformed portion. Furthermore, it is possible to perform the swaging process of the thin portion and the processing of the deformed portion simultaneously, so production efficiency can be improved.

In the swaging process, a plurality of punches is disposed uniformly in the circumferential direction and these punches are pressed to the thin portion. Accordingly, it is possible to form a plurality of swaged portions in a stable shape and size without the pressing depending on the circumferential position.

The length of the punch is equal to or greater than a length of the swaged portion after the swaging process of the thin portion with respect to the axial direction. Accordingly, it is possible to closely adhere the swaging portion to the rod as a whole.

The punch has a concave contact surface with the thin portion. Accordingly, it is possible to cause the bottom of the swaging portion to follow the outer circumference of the thin portion and transmit the load of the punch to the thin portion using the whole surface of the front end surface. Therefore, the surface pressure of the punch is applied wholly to the front end surface, and the durability of the punch can be improved.

The embodiment described above is a cylinder device including a piston installed slidably in a cylinder with a fluid sealed therein, a channel which is formed in the piston to flow the fluid therein, a rod of which one end is inserted into an annular disk valve for opening and closing the channel and the piston, and the other end thereof extends outward from the cylinder, and a nut which is screwed to a screw portion formed on one end of the rod to apply an axial force to the piston and the disk valve. A tool mounting portion is formed on a side of a seat surface of the nut, and an annular thin portion is formed on the tool mounting portion opposite to the seat surface. Swaged portions are formed on a plurality of places of the thin portion in a circumferential direction. An extended portion, in which the thickness of the thin portion flows and extends to a front end of the rod partially in the circumferential direction, is formed in the swaged portion. The extended portion closely adheres to the screw portion of the rod. Thus, the thickness of the thin portion is flowed to be lengthened to the front end of the bolt partially in the circumferential direction so as to be closely adhered to the screw portion of the bolt, by performing the swaging process, in which a plurality of places are swaged with the punch from the outer circumferential direction, on the annular thin portion of the nut mounting portion formed on the opposite side to the seat surface of the nut. Therefore, it is possible to increase torque need to loosen while suppressing cost increase. Thus, by increasing the torque need to loosen, it is possible to stabilize the residual axial force applied to the piston or the disk valve and suppress the deviation of damping force.

The screw portion of the rod facing the extended portion has a corrugated deformed portion. Accordingly, the torque need to loosen can be increased much more.

The length of the extended portion extending to the front end of the rod of the nut is longer than a length obtained by dividing the pitch dimension of the screw portion of the rod by the number of swaged portions. Accordingly, the torque need to loosen can be increased much more.

The length of the extended portion extending to the front end of the rod of the nut is longer than the pitch dimension of the screw portion of the rod. Accordingly, the torque need to loosen can be increased much more.

While preferred embodiments of the present invention have been described, the present invention is not limited to the embodiments. Additions, omissions, substitutions, and other variations may be made to the present invention without departing from the spirit and scope of the present invention. The present invention is not limited by the above description, and is limited by the appended claims.

What is claimed is:

1. A fastening method for fastening a nut to a bolt by screwing, the fastening method comprising:
    preparing a nut including a tool mounting portion formed on a side of a seat surface, and an annular thin portion formed on the tool mounting portion opposite to the seat surface,
    supporting the bolt at a position of the bolt opposite to where the nut is attached using a work support base which is configured to be movable along an axial direction of the bolt, and
    swaging a plurality of places of the thin portion with punches from an outer circumferential direction in a state where the nut is fastened to the bolt,
    wherein the swaging causes a thickness of the thin portion to plastically deform so as to extend to a front end of the bolt partially in a circumferential direction to be closely adhered to a screw portion of the bolt, and wherein the work support base and the bolt move in a direction opposite to the front end of the bolt in accordance with a progress of the swaging.

2. The fastening method according to claim 1, wherein a screw thread of the screw portion of the bolt is deformed partially in the circumferential direction, inward in a radial direction, and in the axial direction toward the front end of the bolt by an extended portion of the nut extending to the front end of the bolt.

3. The fastening method according to claim 2,
    wherein swaged portions are formed at positions uniform in the circumferential direction of the nut, and
    wherein a length of the extended portion of the nut extending to the front end of the bolt is longer than a length obtained by dividing a pitch dimension of the screw portion of the bolt by a number of swaged portions.

4. The fastening method according to claim 2, wherein a length of the extended portion of the nut extending to the front end of the bolt is longer than the pitch dimension of the screw portion of the bolt.

5. The fastening method according to claim 1, wherein a plastically deformed portion with a deformed screw thread is formed on the exposed portion not covered with the thin portion of the screw portion.

6. The fastening method according to claim 5, wherein the plastically deformed portion is formed by applying a force to the screw portion in the radial direction.

7. The fastening method according to claim 5, wherein the plastically deformed portion is formed at a position in a circumferential direction of the screw portion corresponding to a portion on which the swaging process of the thin portion is not performed.

8. The fastening method according to claim 1, wherein, in the swaging process, a plurality of punches is disposed uniformly in the circumferential direction and these punches are pressed to the thin portion.

9. The fastening method according to claim 1, wherein a length of the punch is equal to or greater than a length of the swaged portion after the swaging process of the thin portion with respect to the axial direction.

10. The fastening method according to claim 1, wherein the punch has a concave contact surface with the thin portion.

11. The fastening method according to claim 1,
    wherein the work support base supports the bolt so that the front end of the bolt faces upward and is configured to be movable in a vertical direction, and
    wherein the work support base is biased by a biasing unit to maintain the bolt at a set position of reference height.

12. The fastening method according to claim 11,
    wherein the work support base moves downward against a biasing force of the biasing unit in accordance with progress of swaging, and
    wherein an inclined surface, which is inclined so as to be further separated axially from the tool mounting portion inward in the radial direction, is formed on at least one of a plurality of recessed portions, each of which is recessed radially inward by swaging, at a portion near the tool mounting portion.

13. The fastening method according to claim 2,
    wherein the extended portion has a curving and projecting shape so that middle portion of the extended portion in the circumferential direction of the nut is more protruded in the axial direction than both sides of the extended portion in the circumferential direction of the nut, and
    a deformed portion of the screw portion of the bolt which faces the extended portion has a curving and corrugated shape so that middle portion of the deformed portion in the circumferential direction of the bolt is more protruded in the axial direction than both sides of the deformed portion in the circumferential direction of the bolt.

* * * * *